United States Patent [19]

Onishi et al.

[11] Patent Number: 5,347,591
[45] Date of Patent: Sep. 13, 1994

[54] METHOD OF AND DEVICE FOR DETERMINING POSITIONING BETWEEN A HOLE AND A WIRING PATTERN ON A PRINTED CIRCUIT BOARD BY UTILIZING A SET OF AREA VALUES

[75] Inventors: Hiroyuki Onishi; Tetsuo Hoki, both of Kyoto, Japan

[73] Assignee: Dainippon Screen Mfg. Co., Ltd., Kyoto, Japan

[21] Appl. No.: 784,574

[22] Filed: Oct. 29, 1991

[30] Foreign Application Priority Data

Oct. 30, 1990 [JP] Japan .................................. 2-294106

[51] Int. Cl.$^5$ ............................................. G06K 9/00
[52] U.S. Cl. .......................................... 382/8; 382/14; 382/25; 395/912
[58] Field of Search ............................ 382/8, 14, 25, 26; 395/21, 912, 916; 358/101, 106, 107; 356/237

[56] References Cited

U.S. PATENT DOCUMENTS

| | | | |
|---|---|---|---|
| 4,555,798 | 11/1985 | Broadbent, Jr. et al. | 382/8 |
| 4,866,629 | 9/1989 | Chen et al. | 364/468 |
| 4,893,346 | 1/1990 | Bishop | 382/8 |
| 5,027,417 | 6/1991 | Kitakado et al. | 382/8 |
| 5,144,681 | 9/1992 | Kitakado et al. | 382/8 |
| 5,150,422 | 9/1992 | Kitakado et al. | 382/8 |

Primary Examiner—Leo H. Boudreau
Assistant Examiner—Andrew W. Johns
Attorney, Agent, or Firm—Ostrolenk, Faber, Gerb & Soffen

[57] ABSTRACT

A printed board, on which a wiring pattern and a through hole to be inspected are provided, is scanned pixel by pixel and is read optically. The data obtained by scanning is converted into an electric signal to obtain image data. On the basis of the image data thus obtained, a pattern image representing the wiring pattern an a hole image representing the through hole are obtained. A center and a radius of the hole image are obtained from the image data. Then, a plurality of ring-shaped masks are obtained by magnifying the hole image at a plurality of magnifications. The size of the pattern image is normalized by the size of the hole image, and the, respective areas of overlapped regions between a plurality of the ringshaped masks and the pattern image are detected. Since these areas are obtained with an isotropic method, they do not depend on the directions of a line entering a land. By simulation, correspondence between the area of the overlapped regions and a relative positional relation between the wiring pattern and the through hole is obtained in advance. On the basis of this known correspondence, a relative positional relation between the wiring pattern and the through hole is evaluated by utilizing a neural network that has been taught such known correspondence.

12 Claims, 31 Drawing Sheets

F I G. 1A
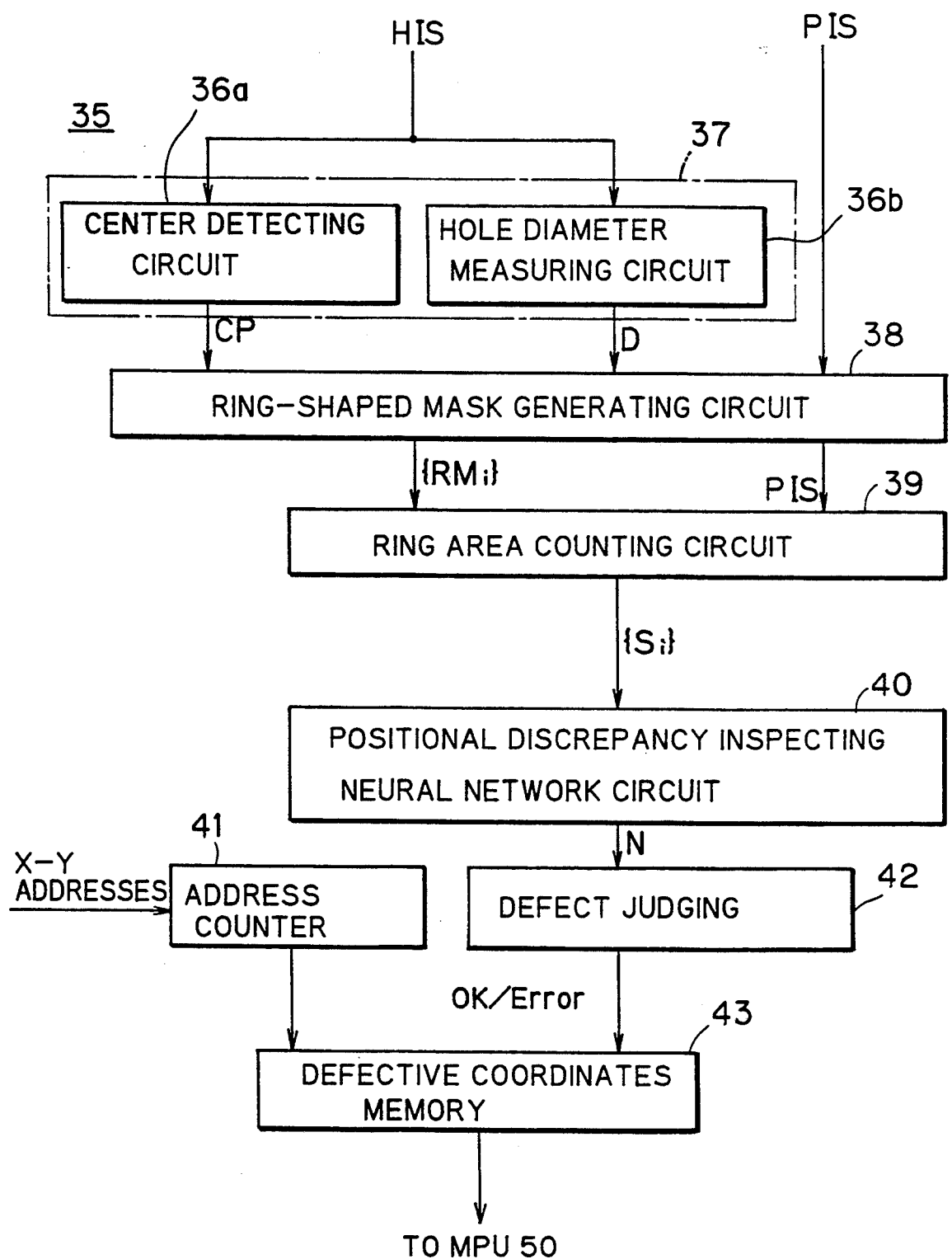

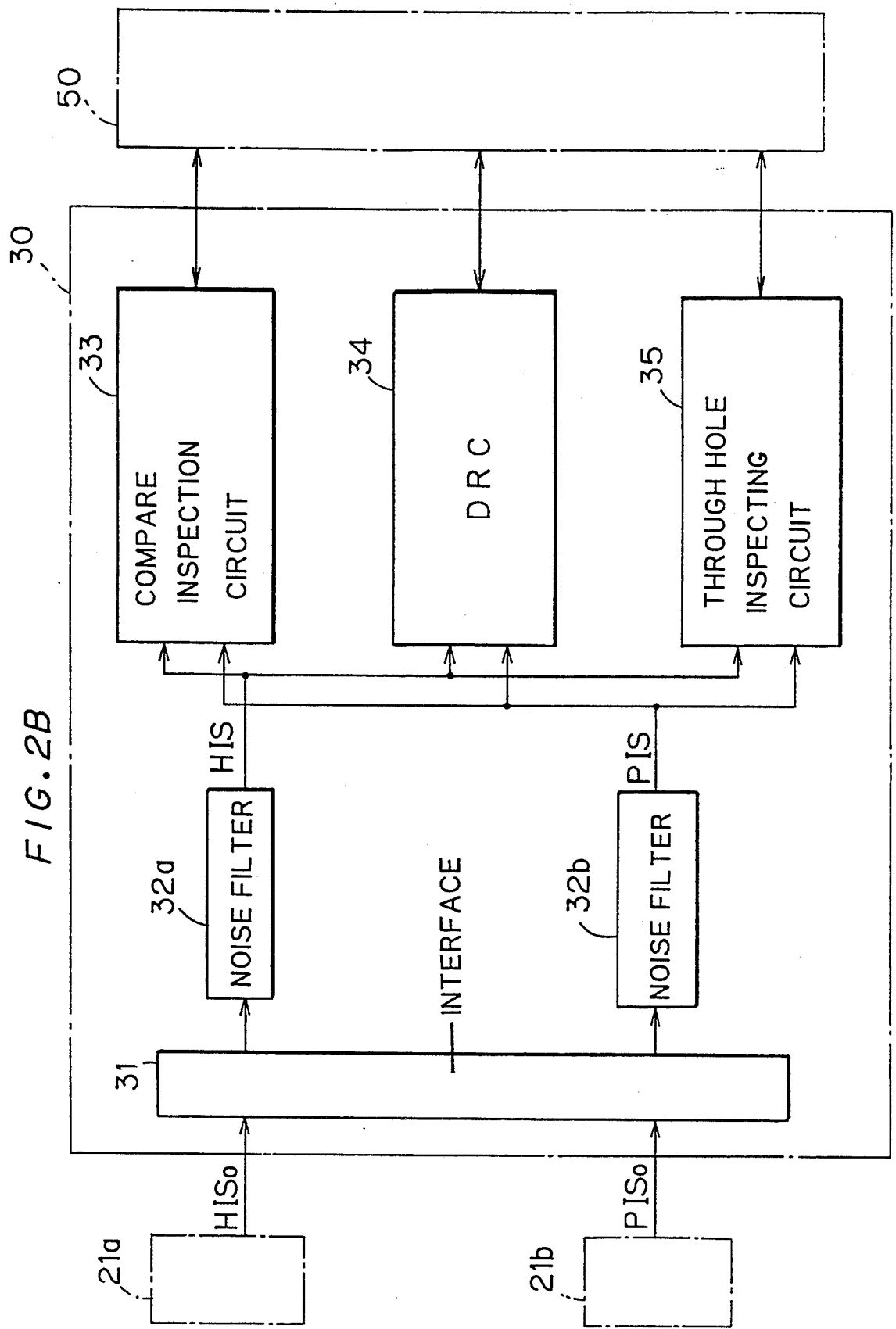

$S_j =$ (THE AREA OF $A_j$ )

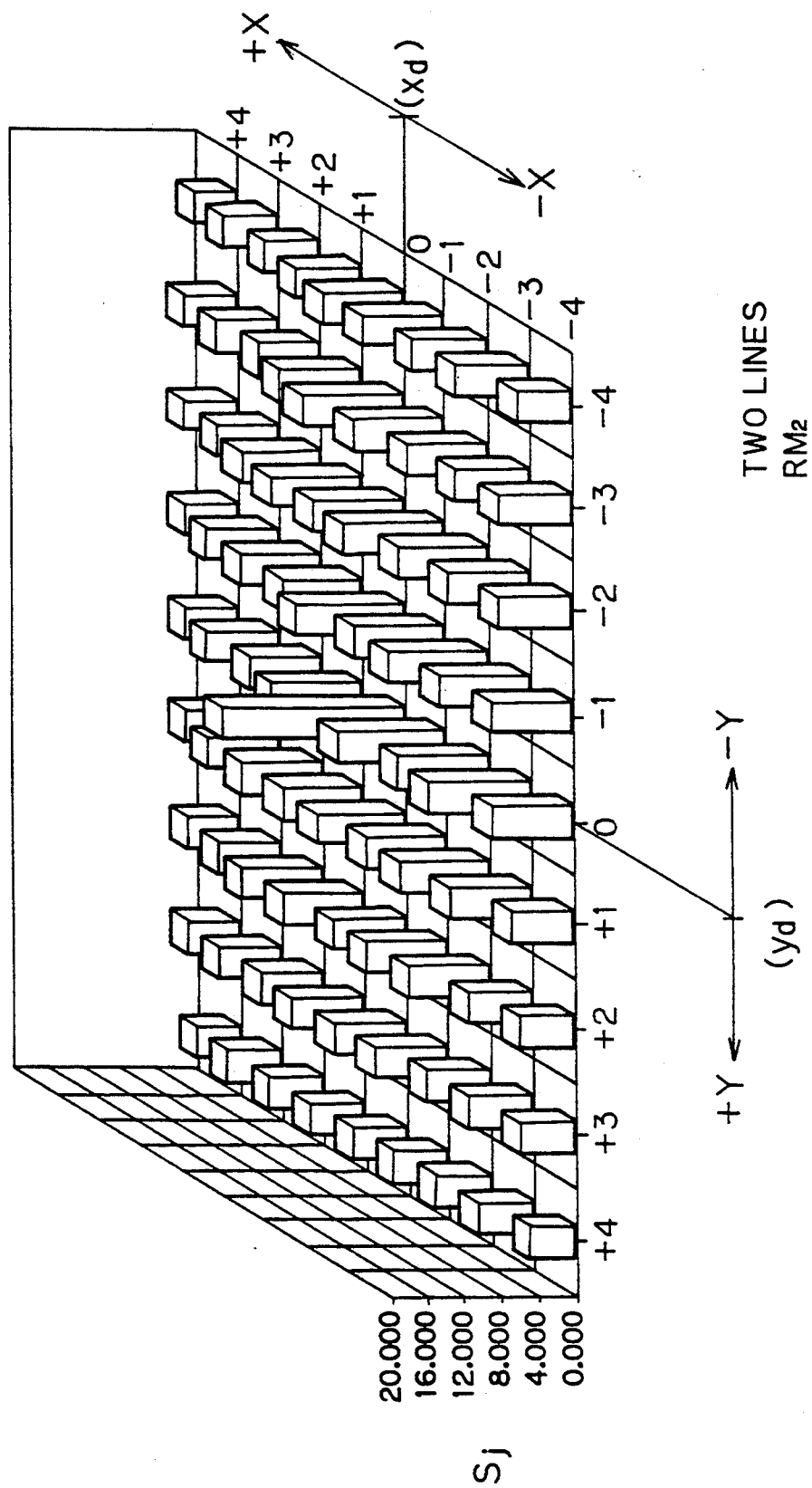

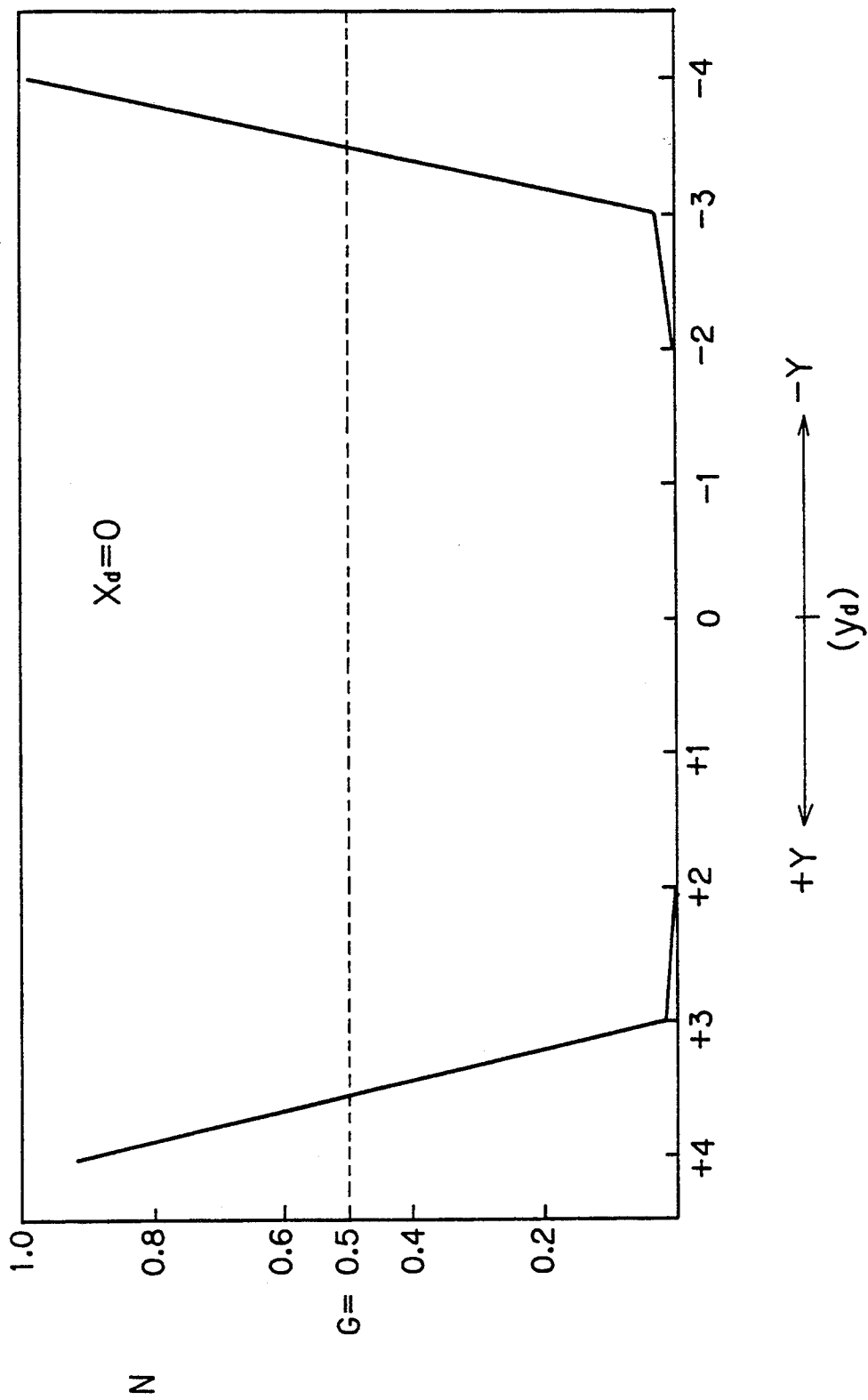

METHOD OF AND DEVICE FOR DETERMINING POSITIONING BETWEEN A HOLE AND A WIRING PATTERN ON A PRINTED CIRCUIT BOARD BY UTILIZING A SET OF AREA VALUES

BACKGROUND OF THE INVENTION

1. Field of the Invention

The present invention relates to a method of and device for inspecting a pattern on a printed board, and more particularly relates to an inspecting method for judging a relative positional discrepancy between a wiring pattern and a through hole (in which a mini-via hole is included).

2. Description of the Prior Art

With advancement in miniaturization and realization of high performance for electronic parts, patterns on printed board circuits has been formed in microstructure as well as in high density. This trend has brought about requirements of narrowing pattern width and decreasing the diameter of through holes. In particular, the diameter of through holes which are employed as conductive holes in multi-layer substrates have been decreased. The diameter of this type of through holes was conventionally 0.8 mm. At present, the diameter has been further decreased, and through holes having diameter of 0.1 to 0.5 mm, known as mini-via holes, are employed.

As the diameter of through holes has been decreased, there have arisen demands for new techniques in various fields related to treating through holes including plating, drilling, processing and reliability testing.

In general, accuracy in drilling processes is inferior to that in photoetching processes, so that in many cases drilled through holes deviate from desired patterns. However, a slight positional discrepancy has only a slight influence on electronic reliability of substrates, since sufficiently large lands are provided around the through holes which have a diameter of about 0.8 mm.

With advancement in the technique of decreasing diameter of through holes, smaller lands are formed around the holes. Accordingly, it has become difficult to guarantee absolute accuracy in providing a hole which is to be employed as a through hole within a land, and there has arisen the problem of electronic reliability of printed circuit boards. Specifically, electronic reliability has deteriorated due to the positional discrepancy of the hole. Therefore, inspection on positional discrepancy of through holes becomes extremely important.

The inspection on positional discrepancy of holes requires two-way approaches; electronic inspection and visual inspection. For visual inspection, an inspecting device for detecting light which leaks from cracks of a metal plate is well known. However, for multi-layered board construction, there are additional problems to be solved. Furthermore, this inspecting device cannot be applied to inspecting pattern breaks which are caused by relative positional discrepancy between through holes and wiring patterns.

FIGS. 18A and 18B illustrate the positional relations between a land R and a through hole H within a wiring pattern P. In FIG. 18A, the center O of the through hole H coincides with the center of the land R, and the pattern is good. In FIG. 18B, the center O of the through hole H is deviated from the center of the land R, and part of the through hole H projects into the exterior of the land R. The size of this projecting part can be expressed by the aperture angle $\theta$. When the aperture angle $\theta$ is larger than a predetermined reference value, it is judged that the pattern break is defective.

Whether pattern breaks are good or defective can be determined by detecting the aperture angle $\theta$. Most conventional inspecting techniques rely upon human eyes using a magnifying lens or the like to detect the aperture angle $\theta$.

A technique for automatically detecting this aperture angle $\theta$ is disclosed by Japanese Patent Application No. 1-82117, which was filed by the present applicant. That technique referring is explained herein with reference to FIG. 19. According to that technique, the aperture angle $\theta$ is obtained by detecting an overlapped region WR between a pattern RI of the land R which is expanded at a proper magnification and a contour RP of the hole H which is also expanded and magnified at a proper magnification.

This technique is excellent, as compared to difficulties of binary techniques, when applied in treating an opening edge of the through hole. However, since this technique relies upon the aperture angle $\theta$ to judge whether pattern breaks are good or defective, there is a high probability of misjudgement in this technique in the case shown in FIG. 20A where a plurality of patterns LI of lines L enter a pattern RI of the land. In the case shown in FIG. 20B where the land pattern RI is somewhat deformed, or when there is significant influence of quantization errors or noise which cannot be cut through a noise filter. It is not possible to obtain an accurate aperture angle which is represented by dashed lines in FIGS. 20A and 20B, respectively.

SUMMARY OF THE INVENTION

The present invention is directed to a method of inspecting a pattern on a printed circuit board on which a wiring pattern is provided and through which a through hole is formed.

According to the present invention, the method comprises the steps of: (a) optically reading the printed board for each pixel to obtain image data representing an image of the printed board; (b) obtaining a pattern image representing the wiring pattern and a hole image representing the through hole on the basis of the image data; (c) obtaining a plurality of similar ring-shaped masks from the hole image; (d) calculating an area of an overlapped region on which the pattern image and each of the plurality of similar ring-shaped masks overlap each other, to thereby obtain a set of area values; and (e) obtaining a relative positional relation between the wiring pattern and the through hole as a function of the set of area values.

In a preferred embodiment of the present invention,, a correlation between said relative positional relation and the set of area values is previously obtained. The set of the area values are converted through the correlation to obtain a characteristic value representing the relative positional relation.

Preferably, the step (e) may be conducted using a neural network.

In an aspect of the present invention, a plurality of similar pattern images are obtained. The area of each region on which a similar pattern image and one ring-shaped mask overlap each other is counted to obtain a plurality of area values.

In another aspect of the present invention, a plurality of similar pattern images and a plurality of similar ringshaped masks are obtained. The area is calculated for each region on which each similar pattern image and each ring-shaped image overlap each other.

According to the present invention, the area of the overlapped region contains information on positional discrepancy of the pattern image relative to the hole image. Since the overlapped region is laid between the pattern image and the ring-shaped masks, the area thereof does not depend upon the direction of the line with respect to the land, and is not influenced if a little noise is present.

Furthermore, even when a plurality of lines enter a land, a relative positional discrepancy between the land and the through hole can be inspected with high stability.

The neural network in accordance with the present invention is given information on the area of the overlapped region between the pattern image and the ring-shaped masks. Therefore, information on the positional discrepancy can be properly outputted even in the case where a plurality of lines enter the land. Furthermore, sensitivity of the neural network to the positional discrepancy may be increased or decreased by learning. The employment of the neural network is effective in obtaining an accurate correspondence between the area of the overlapped region and the positional relation (between the wiring patterns and the through hole) on the basis of a relatively small amount of known information.

Accordingly, it is an object of the present invention to obtain a method of and a device for automatically inspecting relative positional discrepancy between the land R and the through hole H with a high stability without receiving influences of a plurality of lines L entering the land R, deformation of the land R, or noise.

This object as well as objects, features, aspects and advantages of the present invention will become more apparent from the following detailed description of the present invention when taken in conjunction with the accompanying drawings.

BRIEF DESCRIPTION OF THE DRAWINGS

FIG. 1A is a block diagram showing a preferred embodiment of the present invention;

FIG. 2B is a block diagram showing a structure of a circuit to which the present invention is applied;

FIGS. 13A to 13E and 14A to 14E are graphs showing relations between ring area characteristics and positional discrepancy;

FIGS. 16A, 16B and 17C are graphs showing relations between outputs from the neural network circuit and positional discrepancy;

DESCRIPTION OF THE PREFERRED EMBODIMENTS

A. Overall Structure and Summarized Operation

Figure 2A:
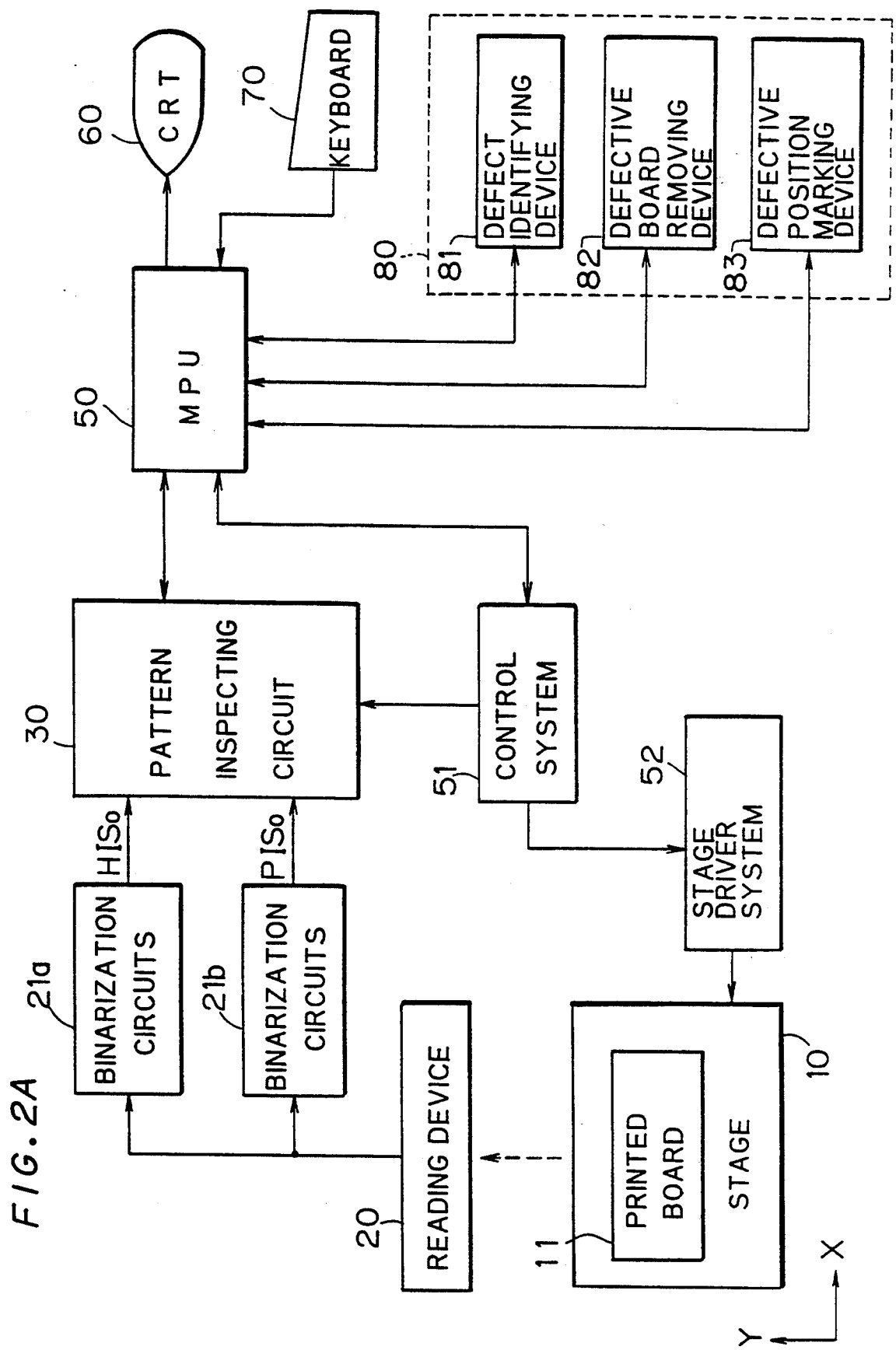
FIG. 2A is a block diagram showing a structure of a device to which the present invention is applied.

FIG. 2A is a block diagram showing the overall structure of a pattern inspection device to which a preferred embodiment of the present invention is applied.

A printed board 11 to be inspected is placed on a stage 10. The printed board 11 is fed in a feeding direction Y while the image thereof is read by a reading device 20 sequentially by each scanning line in a line direction X. The reading device 20 comprises a plurality of CCDs aligned in the line direction X, and each of the CCDs has thousands of elements. The pattern on the printed board 11 is read by the reading device 20 for each pixel. The image data thus read is transmitted to binarization circuits 21a and 21b. The binarization circuit 21a generates a hole image original signal $HIS_0$ which will be more fully described later, while the binarization circuit 21b generates a pattern image original signal $PIS_0$ which will also be described more fully later. Both the signals $HIS_O$ and $PIS_O$ are inputted to a pattern inspecting circuit 30.

The pattern inspecting circuit 30 will be described later in some detail, inspects a relative positional relation between a wiring pattern (in which a land is included) and a through hole, and the inspection result is fed to a micro processor unit (MPU) 50.

The MPU 50 controls the whole device through a control system 51 that generates X-Y addresses for specifying the address of the data obtained in the pattern inspecting circuit 30. The X-Y addresses are also delivered to a stage driver system 52 to control a feeding mechanism for the stage 10.

A CRT (Cathode Ray Tube) 60 receives commands from the MPU 50 to display various calculation results such as a hole image. A keyboard 70 is employed for inputting various commands to the MPU 50.

MPV is connected with an optional portion 80 that includes a defect identifying device 81, a defective board removing device 82, and a defective position marking device 83. The defect identifying device 81 is provided for enlarging a detected defect and displaying the enlarged defect on the CRT 60, for example. The defective board removing device 82 is provided for removing a defective printed board 11 and feeding the same to a defective board tray or the like. The defective position marking device 83 is provided for directly marking the defective position on the printed board 11, or marking a sheet at the portion corresponding to the defective portion. These devices are optionally installed when a need arises.

B. Optical System for Reading

Figure 3A:
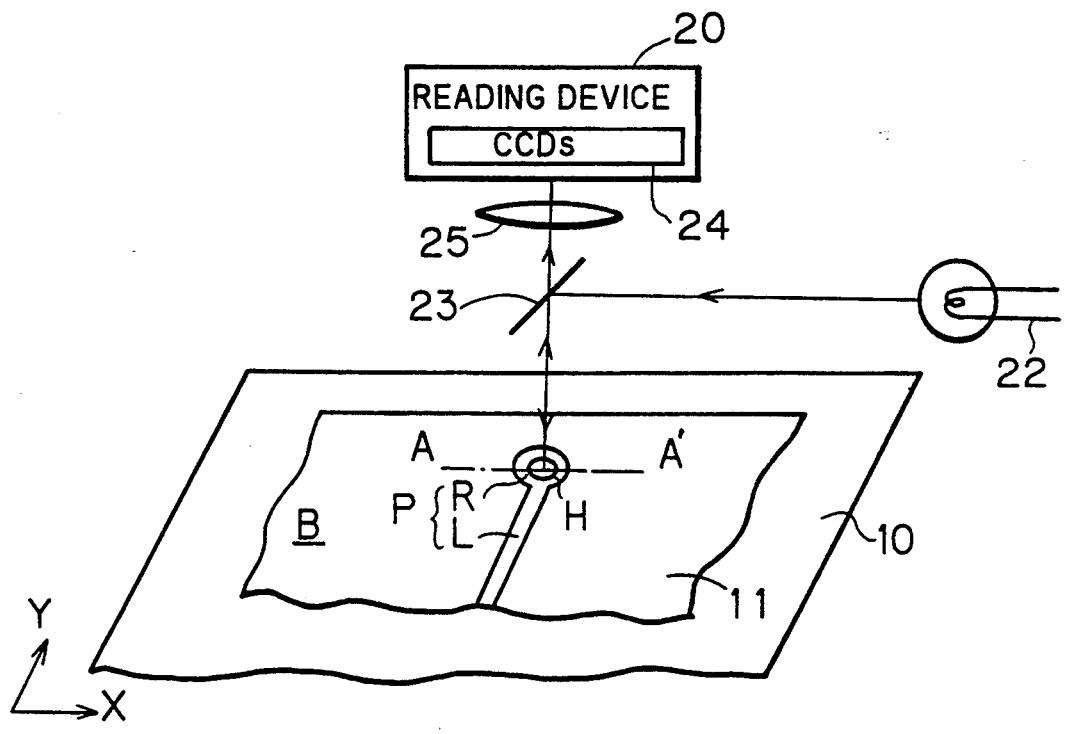
FIGS. 3A and 3B are conceptual views showing how to read image data by photoelectrical scanning.

FIG. 3A illustrates an example of an optical system for reading composed of the stage 10, the printed board 11 and the reading device 20 shown in FIG. 2A.

Referring to FIG. 3A, a light from a light source 22 is reflected at a half mirror 23 to incident on the printed board 11 on the stage 10. Provided on the printed board 11 are a base B which constitutes a foundation of the board 11, a line L, a through hole H and a land R which surrounds the through hole H. The reflected light from the printed board 11 passes through the half mirror 23 and then a lens 25 to incident on CCDs 24 provided in the reading device 20. The CCDs 24 read the lights reflected by the base B, the line L, the through hole H and the land R in a linear order, while the printed board 11 is fed in the feeding direction Y.

Figure 4:
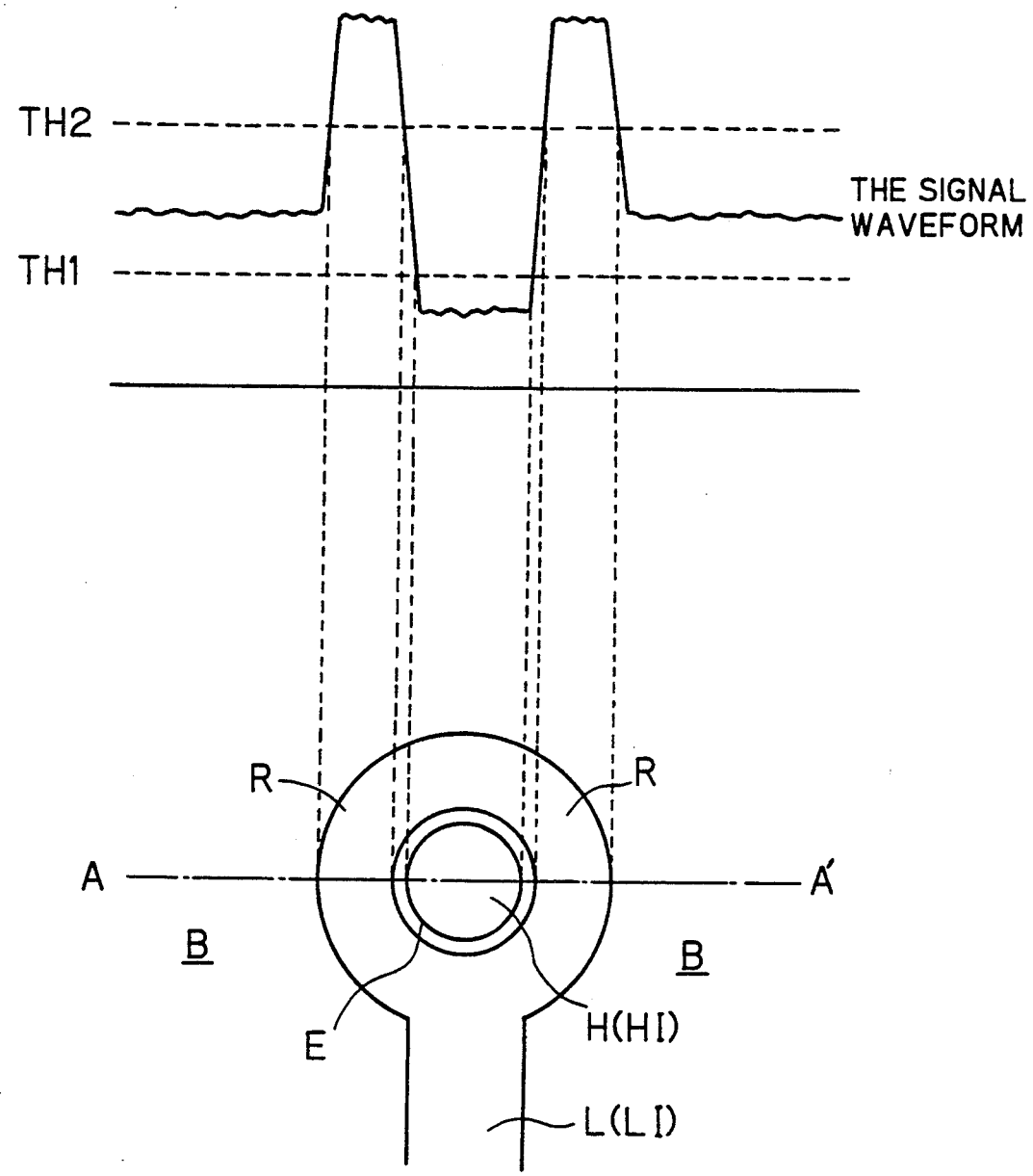
FIG. 4 illustrates a waveform which represents a signal read in the manner shown in FIGS. 3A and 3B, and a pattern which is obtained by synthesizing the waveform.

FIG. 4 illustrates a graph showing a signal waveform which is read along a line A—A' in FIG. 3A, and an example of a pattern which is obtained by synthesizing this waveform.

As can be seen from the signal waveform in FIG. 4, the amount of the light reflected by the base B is relatively low, and the level of the generated signal is between threshold levels TH1 and TH2 (TH1<TH2). Since the land R is made of metal such as copper, the amount of the light reflected thereby is high, and the level of the generated signal exceeds the threshold level TH2. The level of the signal obtained at the line L is same as that at the land R. On the other hand, little light is reflected at the through hole H, and the level of the generated signal is lower than the threshold level TH1. Furthermore, there is usually an edge (opening edge) E between the through hole H and the land R, which is formed in the hole-making process. This edge E has indentations and inclinations, so that the level of the light reflected at the edge E is not constant, and is between the threshold levels TH1 and TH2.

The signal is fed from the reading device 20 to the binarization circuits 21a and 22a shown in FIG. 2A, and is binarized therein with the threshold values TH1 and TH2, respectively, for example. The binarization circuit 21a generates a hole image HI which represents the through hole H, while the binarization circuit 21b generates a pattern image PI which represents the land R and the wiring pattern P. These two images HI and PI are employed as necessary signals for a process, which will be described later.

Figure 3B:
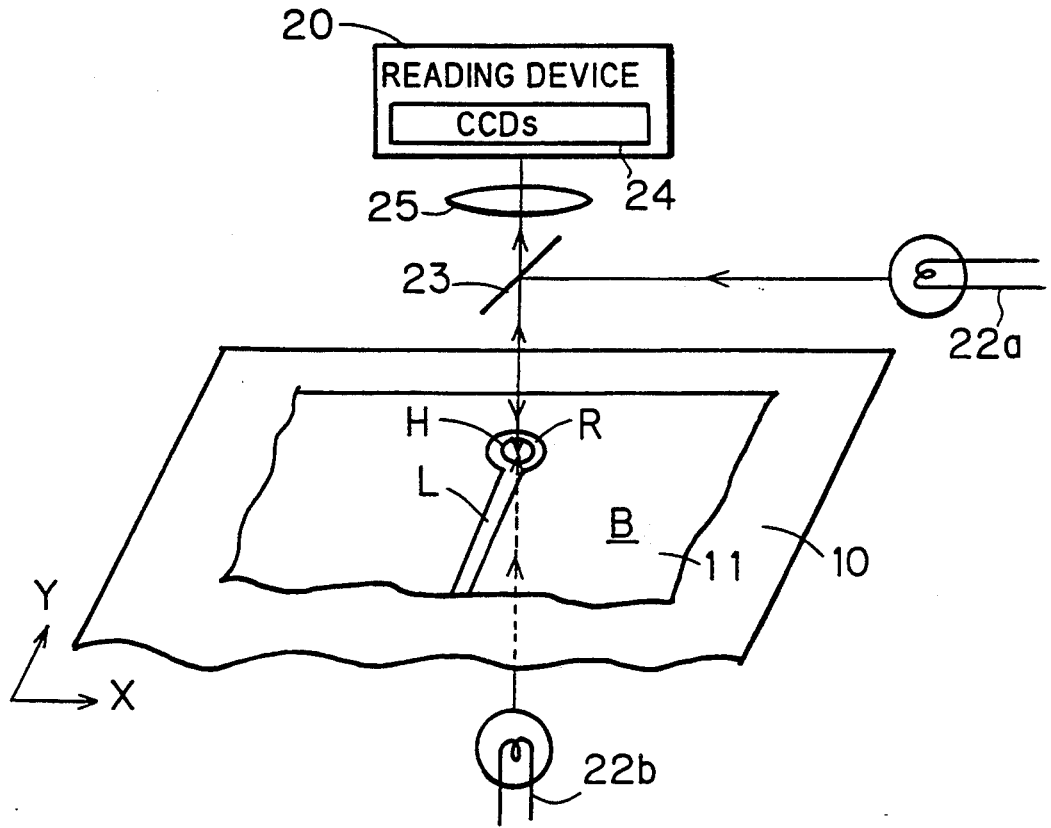

FIG. 3B illustrates another example of an optical system for reading. Similar to the example shown in FIG. 3A, in the example of FIG. 3B a light from a light source 22a incidents on the CCD 24 as a reflected light through the half mirror 23 and the lens 25. In this example, another light source 22b is also provided in back of the stage 10, so that a light passing through the through hole H also illuminates on the CCDs 24. Accordingly, the level of the generated signal is maximal at the through hole H, is intermediate at the land R and the line L, and is relatively low at the base B and the edge E.

As another example, the reading device 20 may comprise a plurality of CCD linear arrays, with one of these arrays being used for detecting the land R and the wiring pattern P by receiving the light from the light source 22a, while another of these arrays is used for detecting only the through hole H by receiving the light from the light source 22b. In this case, respective data thus detected are individually outputted to the binarizing circuits which are provided in the following stage.

C. Pattern Inspecting Circuit

FIG. 2B is a block diagram showing the internal structure of the pattern inspecting circuit 30 shown in FIG. 2A.

The hole image original signal $HIS_0$ and the pattern image original signal $PIS_0$, which are generated in the binarization circuits 21a and 22b, respectively, are transmitted interface 31 to noise filters 32a and 32b respectively. The noise filters 32a and 32b conduct a smoothing processing or the like to remove noise, and generate a hole image signal HIS and a pattern image signal PIS, both of which are transmitted to a compare inspection circuit 33, a DRC (Design Rule Check) circuit 34, and a through hole inspecting circuit 35.

The compare inspection circuit 35 compares the hole image signal HIS and the pattern image signal PIS with image signals for a reference printed circuit which are previously prepared, and specifies the portions differing between the former and the latter as defects. Employed as the reference printed board is the same kind of printed board as the printed board 11 to be inspected, and must have been judged as a good one in advance. This method (a comparison method) is disclosed in Japanese Patent Laying Open Gazette No. 60-263807, for example.

The DRC circuit 34 inspects whether or not the printed board 11 is good or defective by extracting such characteristics of the pattern P on the printed board 11 as line width, pattern angle, continuity, or the like, to thereby judge whether or not these characteristics deviate from respective designated values. This DRC method is disclosed in Japanese Patent Laying Open Gazette No. 57-149905, for example.

D. Through Hole Inspecting Circuit

(D-1) Outline

Outline of the through hole inspecting circuit will be now described before a detail explanation is given for the structure and operation of each part thereof.

Figure 1B:
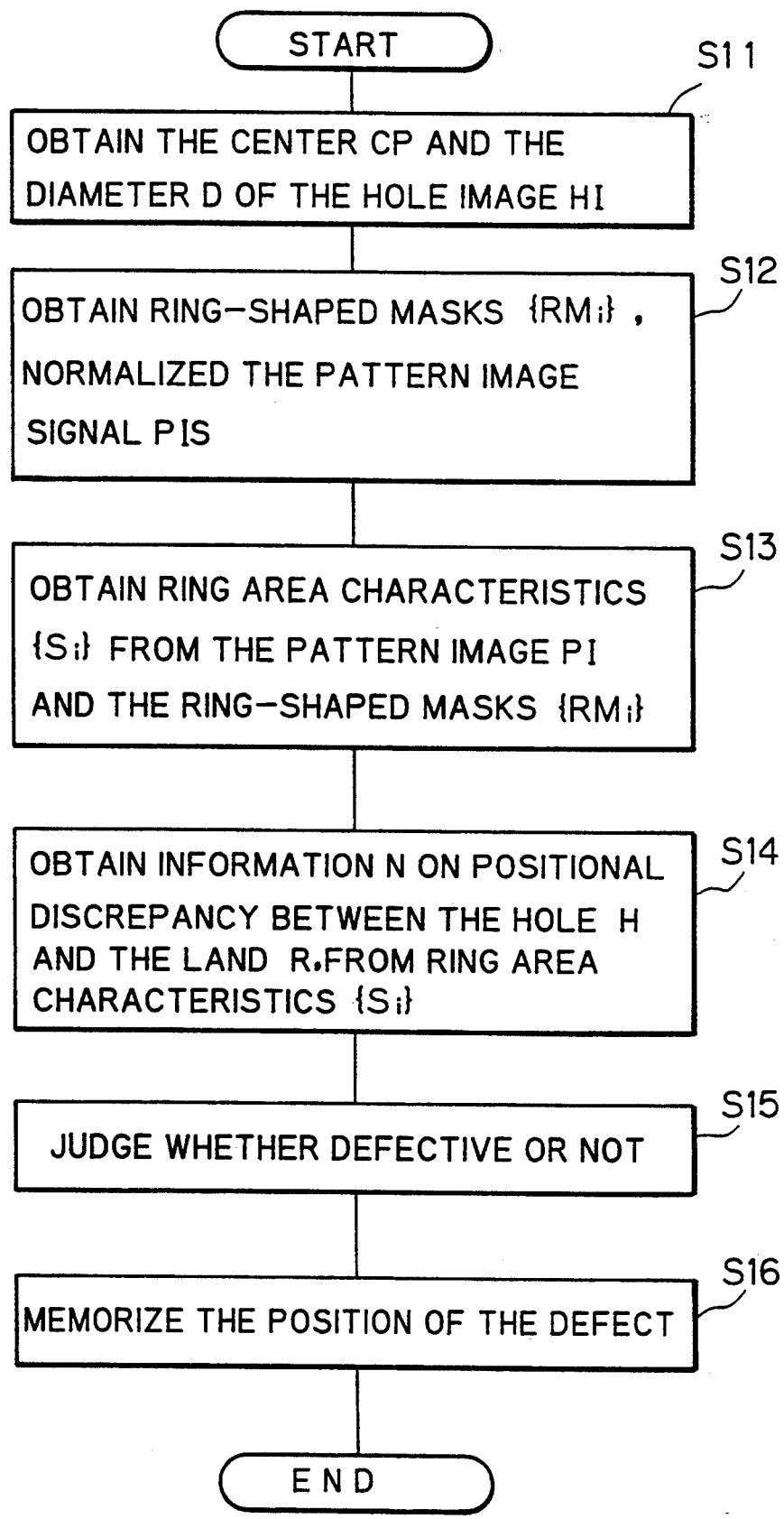
FIG. 1B is a flow chart showing a preferred embodiment of the present invention.

FIG. 1A is a block diagram for the internal structure of the through hole inspecting circuit 35 shown in FIG. 2B, and FIG. 1B is a flow chart showing a processing procedure of a method for inspecting a pattern on a printed circuit, such method being conducted by the circuit having the internal structure shown in FIG. 1A.

A center detecting circuit 36a receives the hole image signal HIS and outputs information CP on the position of the center of the hole image HI, while a hole diameter measuring circuit 36b outputs information defining the diameter of hole image HI, i.e., diameter D, for example. These processes conducted in the center detecting circuit 36a and the hole diameter measuring circuit 36b correspond to the process step S11 in FIG. 1B. The information CP on the center position may be expressed by coordinates (X, Y), otherwise, bits may be employed to define the center position within a positional information matrix [X, Y].

Figure 5:
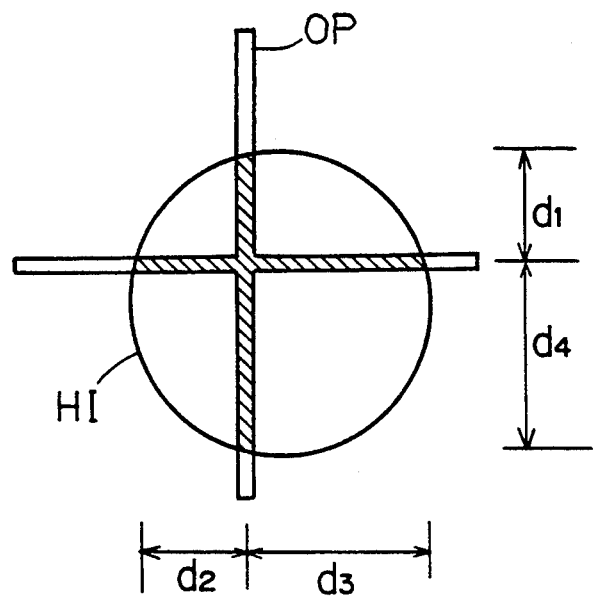
FIG. 5 illustrates conception of a cross operator.

It is not necessary to provide separate center detecting and the hole diameter measuring circuit 36a and 36b. These two circuits may be integrated as a center and hole characteristics detecting Circuit 37. In the case of providing an integrated circuit, a cross-shaped space operator OP is applied to the hole image HI, which is obtained from the hole image signal HIS, to obtain length $d_1$ to $d_4$ with respect to the overlapped portions between the respective four arms of the operator OP and the hole image HI, as shown in FIG. 5, for example. The obtained four lengths are compared with each other to thereby obtain information on the center and the diameter of the hole image HI. This technique using space operator OP is disclosed by Japanese Patent Application No. 2-191343, for example, which was filed by the present applicant.

A ring-shaped mask generating circuit 38 receives the information on the center CP and the diameter D of the hole image HI to generate a plurality of ring-shaped masks $\{RM_i\}(=RM_1, ..., RM_{j-1}, RM_j, RM_{j+1}, ...)$ each of which is concentric with the hole image HI but have a different diameter therefrom. This circuit 38 also receives the pattern image signal PIS to normalize the same by the diameter D of the hole image HI. The processing conducted in the ring-shaped generating circuit 38 corresponds to the process step S12 in FIG. 1B. These ring-shaped masks are generated by magnifying the hole image HI at a plurality of magnifications to thereby obtain logical products of a plurality of the magnified hole images. This magnification process is disclosed by the above-mentioned Japanese Patent Application No. 1-82117, for example. Normalization of the pattern image signal PIS will be described later.

These ring-shaped masks $\{RM_i\}$ and the pattern image signal PIS are inputted to a ring area counting circuit 39 wherein "ring area characteristics" $\{S_i\}$ ($=S_1, ..., S_{j-1}, S_j, S_{j+1}, ...$) are calculated. This processing corresponds to the process step S13 in FIG. 1B. The ring area characteristics $\{S_i\}$ will be more fully described below with reference to FIG. 6.

Each of a plurality of the ring-shaped masks produced in the ring-shaped mask generating circuit 38 is concentric with the hole image HI at the center CP. As can be seen from FIG. 4, the pattern image PI is never included within the hole image HI. Consequently, a requirement can be satisfied by employing ring-shaped masks having the inside diameter larger than that of a mask $RM_1$ whose inside diameter is equal to the diameter D of the hole image HI. Each of the masks may have a width of one pixel, for example.

Since the center CP of the ring-shaped masks $\{RM_i\}$ is expressed by coordinate values (X, Y), for example, there is no difficulty in superposing these masks on the pattern image PI which is obtained from the pattern image signal PIS, maintaining the positional relation between the pattern P and the hole H on the printed board 11.

At this time, the total area of the overlapped regions $A_j$ (hatched portions in FIG. 6) between the ring-shaped masks $RM_j$ and the pattern image PI is referred to as "ring area characteristics $S_j$". As can be seen from FIG. 6 the ring area characteristics $S_j$ includes the area both in the land image RI and the line image LI. Since the ring area characteristics $S_j$ is expressed by an area value it is hardly influenced by the noise having a small area shown in FIG. 6. The position of noise itself does not affect the ring area characteristics $S_j$. Slight deformation of the land R does not influence the ring area characteristics $S_j$. Furthermore, since the masks are of ring shape, the ring area characteristics $S_j$ scarcely depends on the direction of the line image LI to entering the land R.

The ring area characteristics $\{S_i\}$ ($=S_1, S_{j-1}, S_j, S_{j+1}, ...$) is thus obtained with respect to each of the ring-shaped masks $\{RM_1, ..., RM_{j-1}, RM_j, RM_{j+1}, ...\}$.

Referring back to FIG. 1A again, a positional discrepancy inspecting neural network circuit 40 receives the ring area characteristics $\{S_i\}$ thus obtained to output information N concerning positional discrepancy between the hole H and the pattern P, especially between the hole H and the land R. This processing corresponds to the process step S14 in FIG. 1B.

Figure 7:
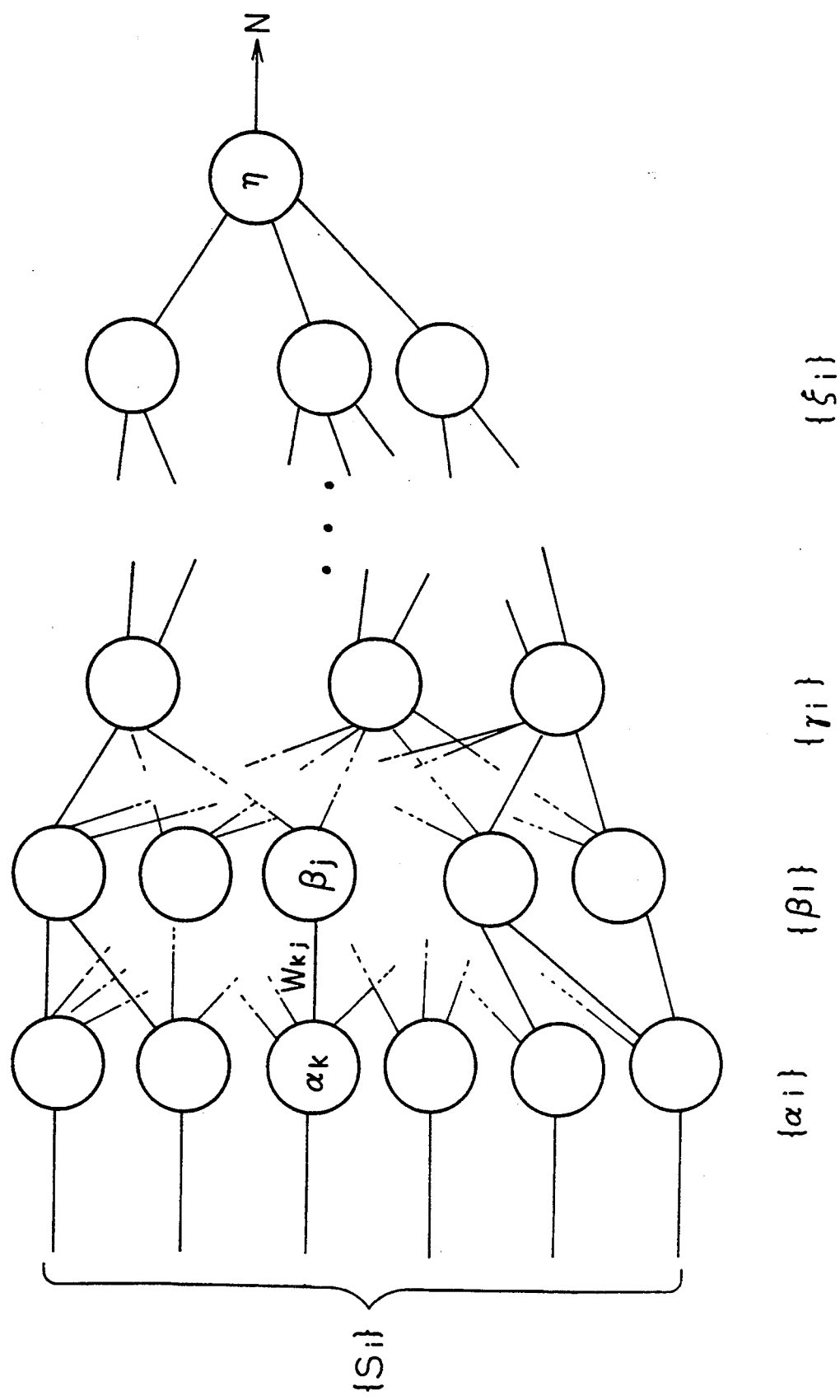
FIG. 7 illustrates conception of a neural network circuit.

The positional discrepancy inspecting neural network circuit 40 is composed of a hierarchical network shown in FIG. 7, for example. The book entitled "Neural Network Information Processing" (written by Hideki ASO, and published by Sangyo Tosho in 1988) gives an explanation for this type of neural network circuits. A brief explanation will be given below. The ring area characteristics $\{S_i\}$ ($=S_1, ..., S_{j-1}, S_j, S_{j+1}, ...$) are inputted to respective corresponding input-layer neurons $\{\alpha_i\}$ ($=\alpha_1, ..., \alpha_{j-1}, \alpha_j, \alpha_{j+1}, ...$). The input-layer neurons $\{_i\}$ transmit the information to the next-layer neurons, i.e., interlayer neurons $\{\beta_i\}$, from which the information is further transmitted to the next interlayer neurons $\{\gamma_i\}$. An output-layer neuron $\eta$ receives the information from the preceding-layer neurons $\{\xi_i\}$ to output information N on positional discrepancy. The number of interlayer neurons is determined in advance according to the processes to be conducted.

When one of the interlayer neurons $\beta_j$ is a unit of a threshold-element type for example weighting $W_{kj}$ is applied to information $J(a)_k$ which has been transmitted from one of the corresponding input-layer neurons $\alpha_k$. The weighting is similarly applied to the information transmitted from other input-layer neurons to the interlayer neuron $\beta_i$. The information thus weighted is transmitted to the interlayer neuron $\beta_i$ wherein the sum of the information is found out. The obtained sum is compared with a threshold value $T_j$ inherent in the interlayer neuron $\beta_j$, whereby an output $J(\beta)_j$ is generated from the interlayer neuron $\beta_j$. The output $J(\beta)_j$ is expressed as follows:

$$J(\beta)_j = \begin{cases} 1 \text{ when } \Sigma\, J(\alpha)_k\, W_{kj} \geq T_j \\ 0 \text{ when } \Sigma\, J(\alpha)_k\, W_{kj} < T_j \end{cases} \quad (1)$$

The hierarchical network comprises the abovedescribed input and output couplings between interlayer neurons.

The weighting $W_{kj}$ of each two neurons can be changed by learning. This will be more fully described in accordance with the preferred embodiment of the present invention. A neuron is taught to output a signal "0" when the land R and the hole H are in the right position, and to output a signal "1" when the hole H is deviates from the land R by 50 $\mu$m, whereby the weighting $W_{kj}$ of an appropriate value can be obtained. As a result, information N on positional discrepancy can be outputted from the neural network. The concrete result of the learning in accordance with the preferred embodiment of the present invention will be described later.

Referring back to FIG. 1A again, the defect judging circuit 42 receives the information N on positional discrepancy to judge whether or not the degree of the discrepancy falls in the defective range. The processing in the defect judging circuit 42 corresponds to the process step S15 in FIG. 1B. For example, discrepancy between the land R and the hole H of more than 30 $\mu$m is judged defective by making the defect judging circuit 42 in advance memorize the output value N, which is outputted from the neural network circuit 40 when the hole H deviates from the land R by 30 $\mu$m.

A defective coordinates memory 43 is provided for memorizing the position of the land R (or the hole H) which is judged defective in the defect judging circuit 42, and receives the positional information from an address counter 41. The address counter 41 produces the positional information by receiving X-Y addresses from the control system 51 which responds to transportation of the printed board 11. This processing corresponds to the process step S16 in FIG. 1B.

In the through hole inspecting circuit, positional discrepancy between the wiring pattern P and the hole H is thus detected to be judged whether or not it is defective.

Concrete examples for the inspection of positional discrepancy will now be described.

(D-2) Ring-Shaped Mask Generating Circuit

Figure 8:
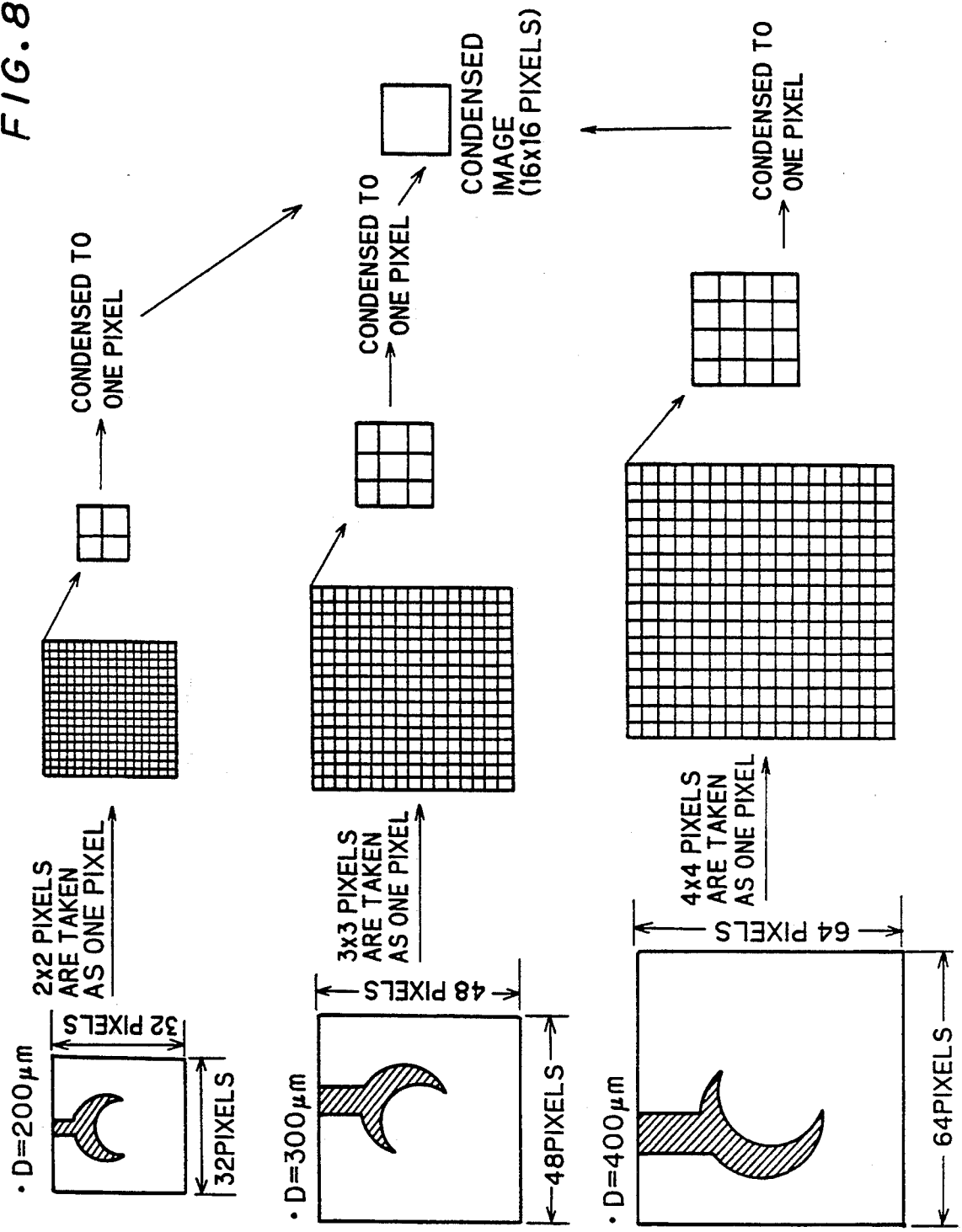
FIG. 8 illustrates normalization of pattern images.

A concrete explanation is given below for an image which is normalized to have 16×16 pixels. Normalization is a processing for providing an adjustment to a large hole (land). Referring to the example shown in FIG. 8, a hole has a hole diameter D of 200$\mu$m. A signal PIS is originally binarized as 32×32 pixels (each pixel is 16$\mu$m$^\square$), wherein the center of the hole image HI occupies the center thereof. Each adjacent 2×2 pixels in the signal PIS are taken as one pixel, thereby the signal PIS is now treated as 16×16 pixels (each pixel is 32 $\mu$m$^\square$). Similarly, when a hole diameter D is 300$\mu$m, each adjacent 3×3 pixels are taken as one pixel, while each 4×4 pixels are taken as one pixel when a hole has a diameter D of 400$\mu$m.

Figure 9A:
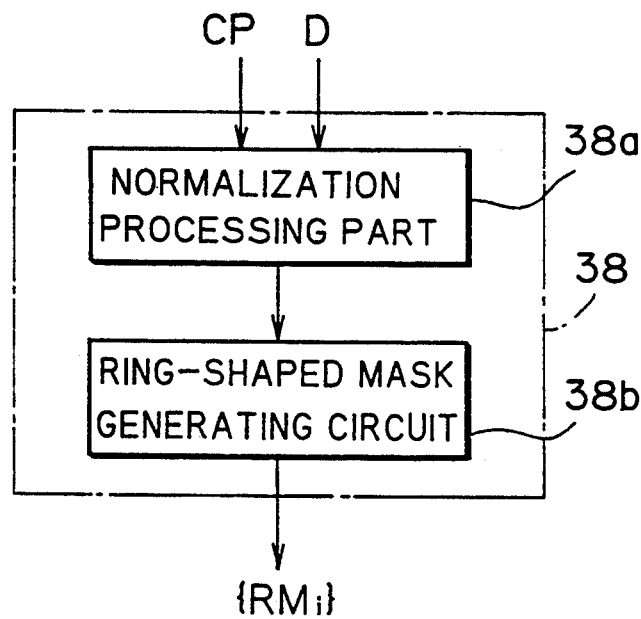
FIG. 9A is a block diagram showing construction of a ring-shaped mask generating circuit.
Figure 9B:
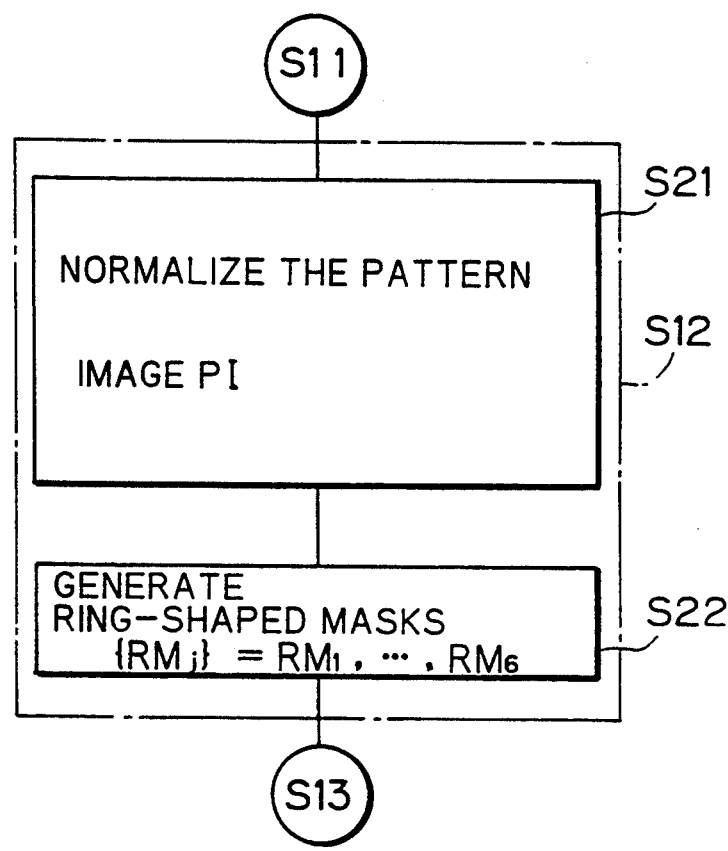
FIG. 9B is a flow chart showing a process flow conducted in the ring-shaped mask generating circuit.

This normalization processing is conducted in a normalization processing part 38a in the circuit 38 shown in FIG. 9A, and corresponds to the process step S21 in the flow chart shown in FIG. 9B wherein the process flow in the circuit 38 is shown.

Then, ring-shaped masks are generated. Each of the masks is approximately concentric with and similar to the image which has been normalized in 16×16 pixels in the manner described above. This processing for generating the ring-shaped masks is conducted in a ring-shaped mask generating circuit 38b, and corresponds to the process step S22 in FIG. 9B.

Figure 10:
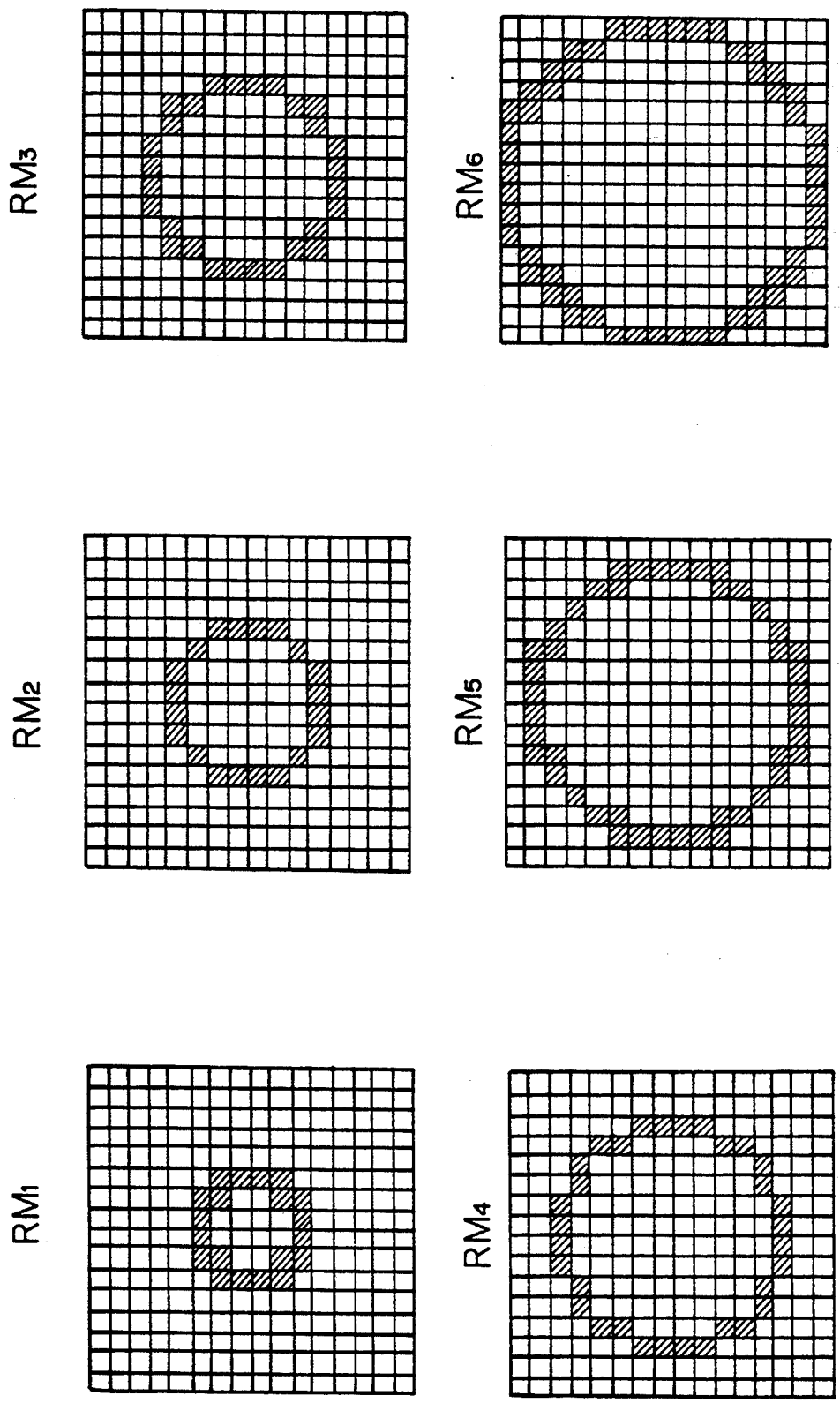
FIG. 10 illustrates ring-shaped masks.

When a width of a ring is of one pixel, six circular masks $RM_1$ to $RM_6$ can be obtained as shown in FIG. 10 since the center CP of the hole image HI is located around the center of 16×16 pixels. It has already shown in FIG. 6 that a mask having a diameter equal to that (the diameter D) of the hole image HI should be chosen as the smallest ring-shaped mask $RM_1$. As to FIG. 10, all of said six ring-shaped masks are illustrated to avoid complication. When the center of the hole is in the right position, the respective ring area characteristics $\{S_i\}$ are positive in the ringshaped masks $RM_2$ to $RM_6$.

In the present embodiment, the pattern image PI is normalized and fixed by varying the size of the ring-shaped masks $\{RM_i\}$. Conversely, the diameter D of the hole image may be normalized and fixed. In this case, the pattern image PI may be magnified or reduced step by step. The term "similar configuration" in accordance with the present invention includes such a normalized configuration, a magnified configuration, a reduced configuration, and the like.

For the sake of simplifying the following explanation, hereinafter a normalized pattern image will be referred to simply as a pattern image.

(D-3) Ring Area Counting Circuit

Figure 6:
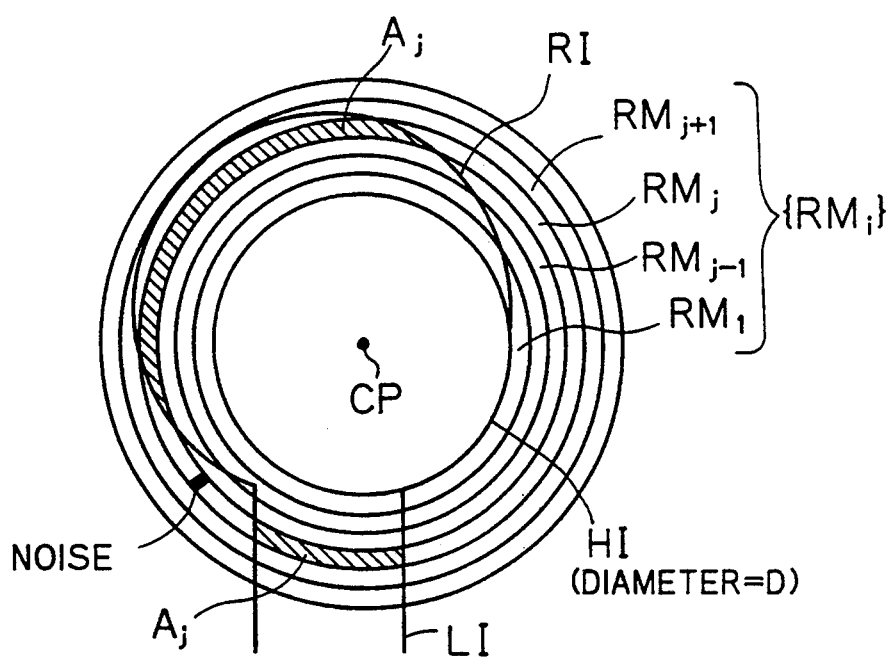
FIG. 6 illustrates conception of a ring area characteristic.
Figure 12A:
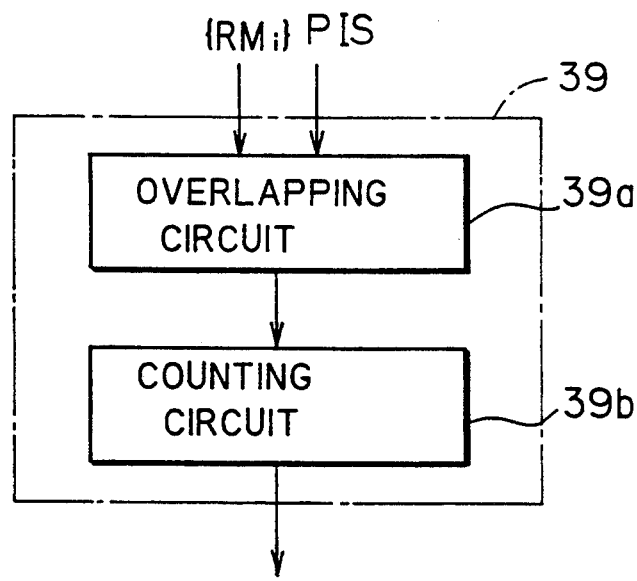
FIG. 12A is a block diagram showing construction of a ring area counting circuit.
Figure 12B:
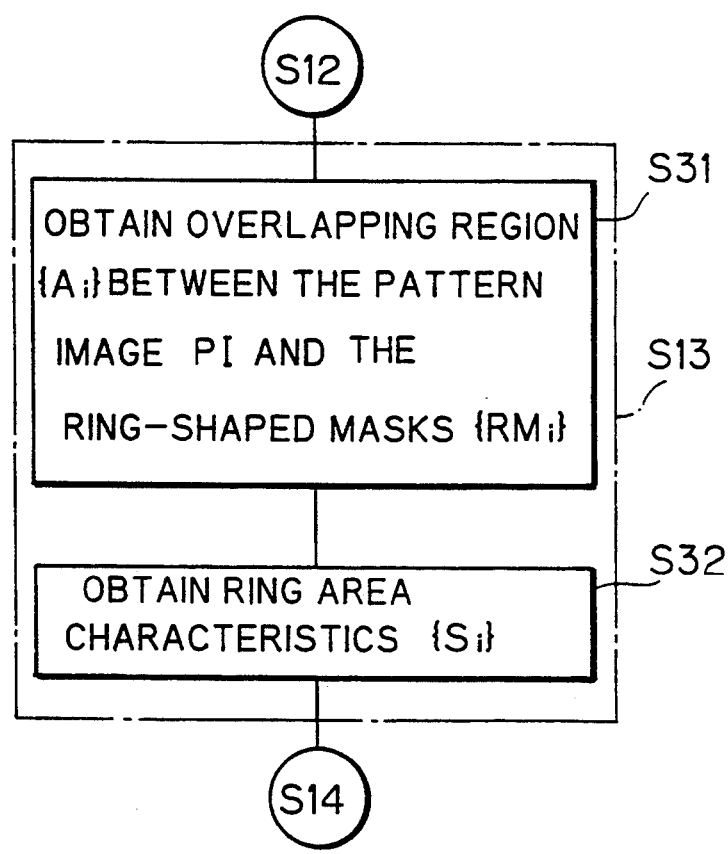
FIG. 12B is a flow chart showing a flow process conducted in the ring area counting circuit.
Figure 14B:
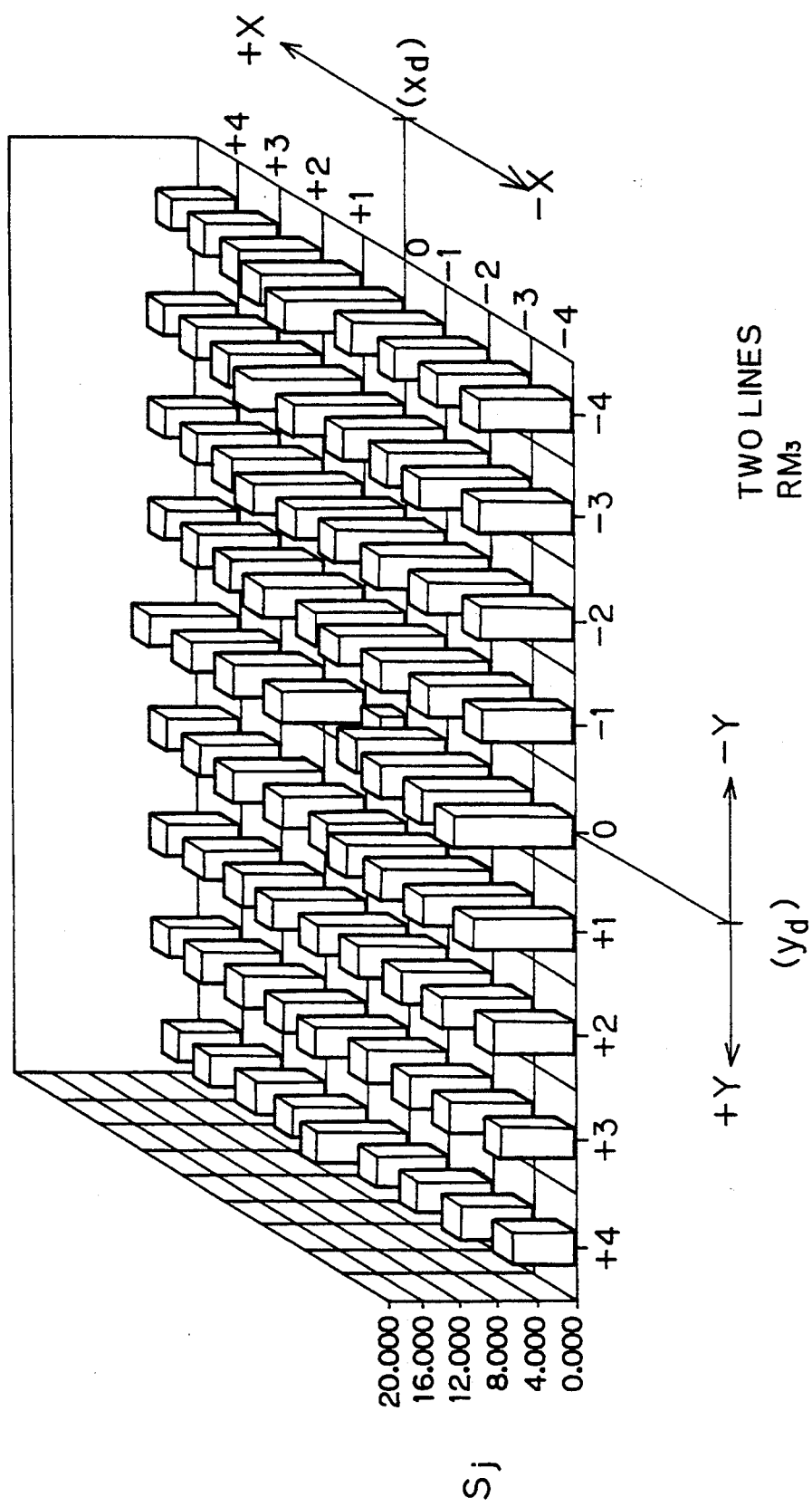
Figure 14C:
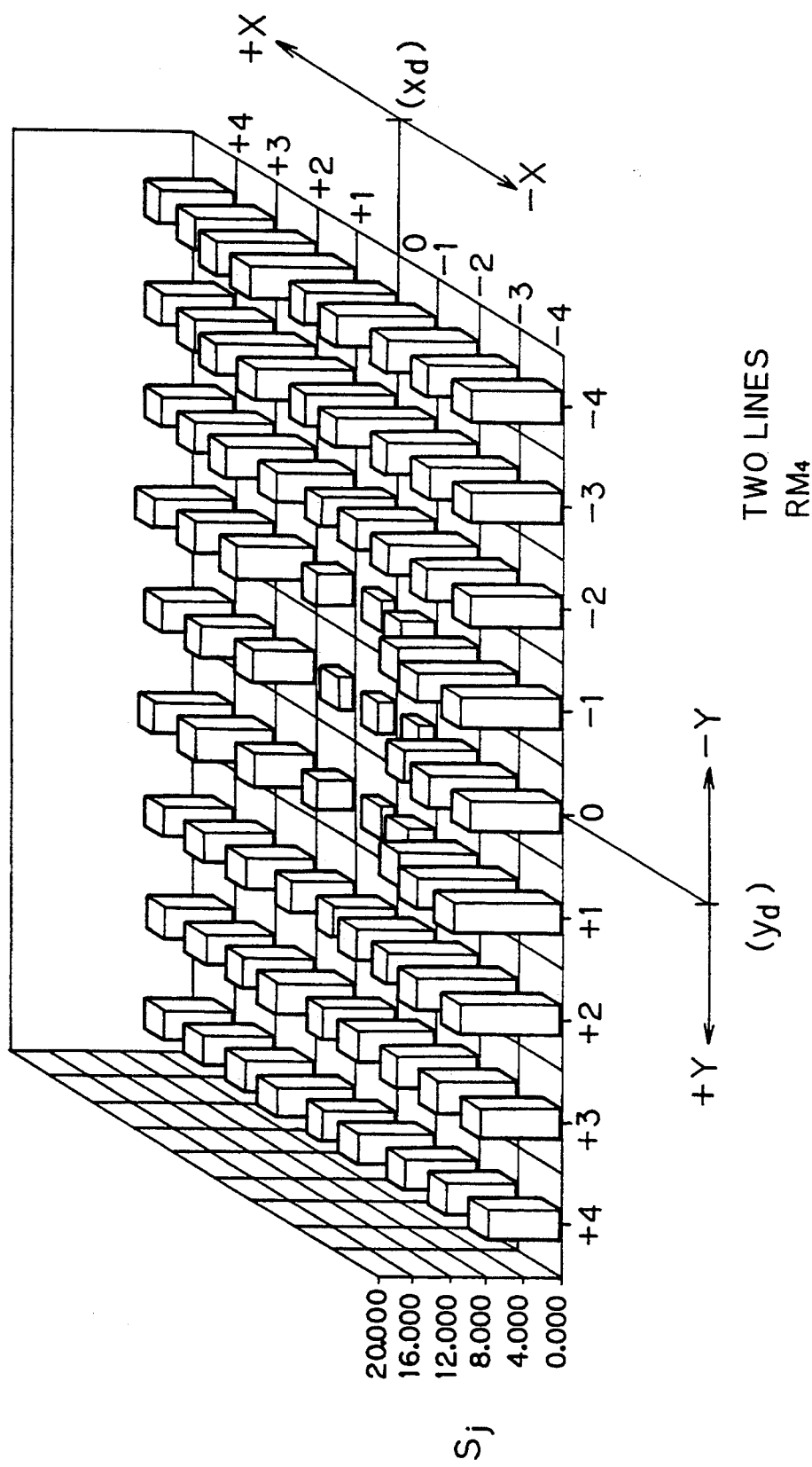
Figure 14D:
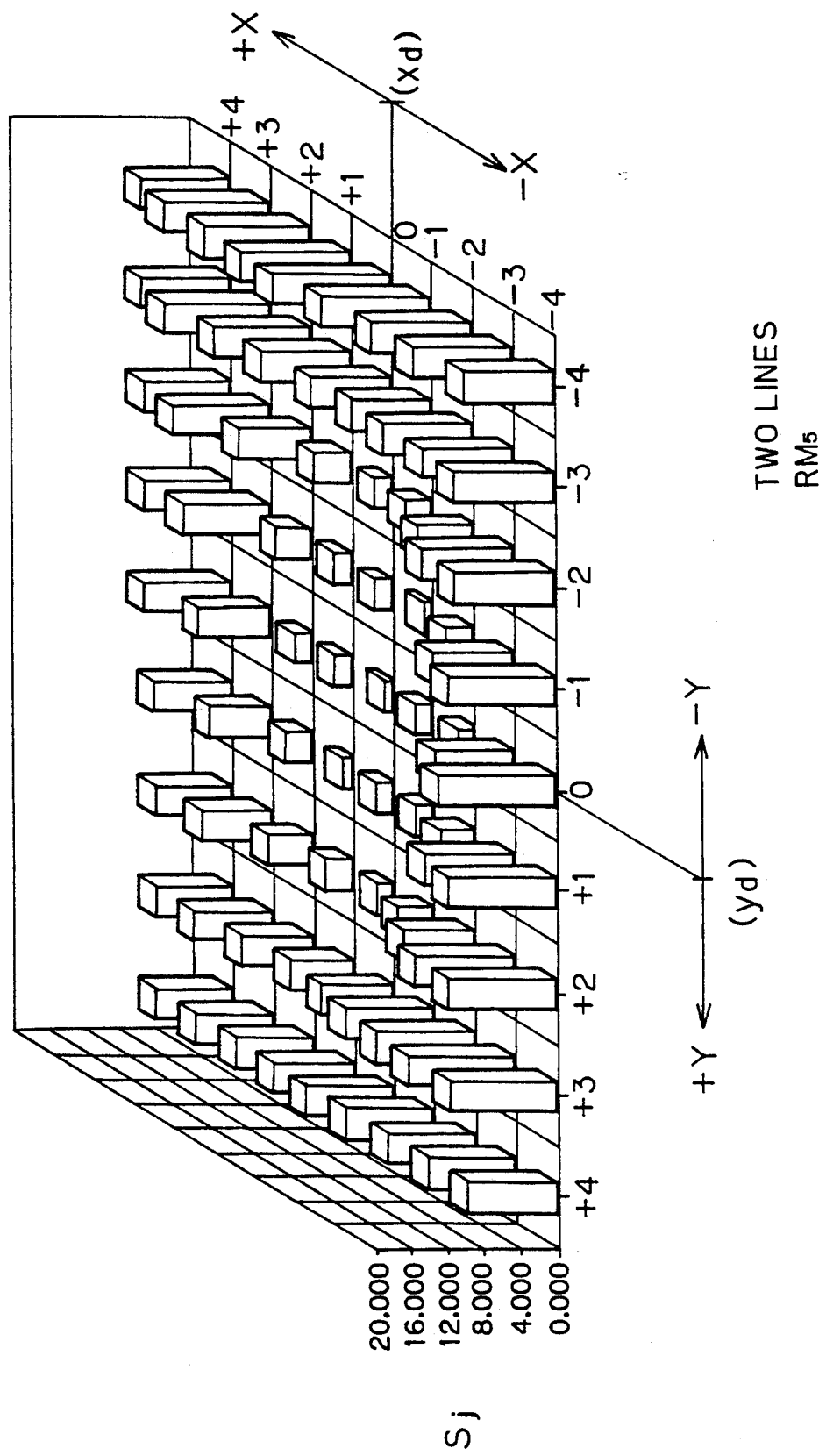
Figure 14E:
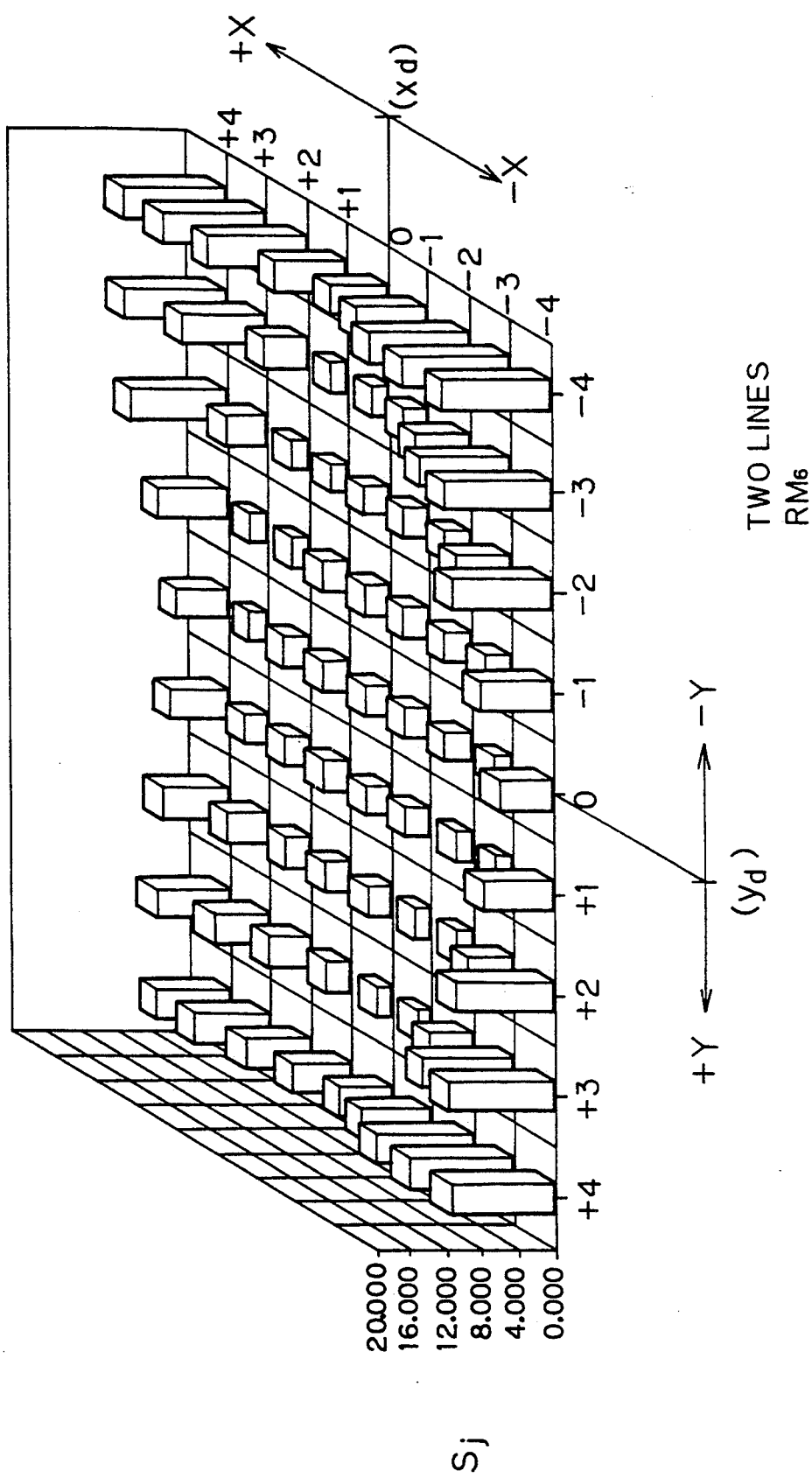

In the ring area counting circuit 39, the ringshaped masks $\{RM_i\}$ thus produced and the pattern image PI restored from the pattern image signal PIS overlap each other to thereby count the area of, i.e., the number of pixels in the overlapping region $A_j$ which is conceptually shown in FIG. 6. FIG. 12A is a block diagram showing the ring area counting circuit 39, and FIG. 12B is a flow chart showing the process flow conducted therein. The pattern image PI and the ring-shaped masks $RM_j$ are overlapped with each other in an overlapping circuit 39a (the process step S31), while the number of pixels included in the overlapping region $A_j$ is counted in a counting circuit 39b (the process step S13).

The center of each of the ring-shaped masks $\{RM_i\}$ coincides approximately with the center CP of the hole image HI. As can be seen from FIGS. 3A and 4, the pattern image signal PIS and the hole image signal HIS can be transmitted in synchronism. Consequently, it is simple to overlap the pattern image PI and the ring-shaped masks $RM_j$, maintaining the relative position therebetween.

Figure 11:
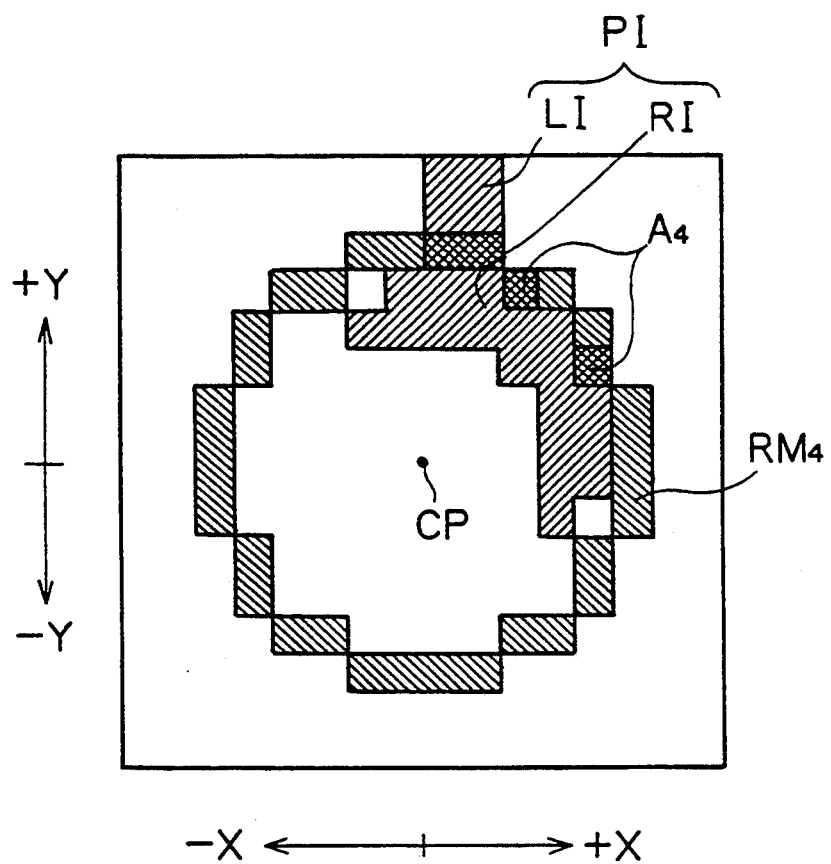
FIG. 11 illustrates conception of ring area characteristics.

In the example shown in FIG. 11, the ring-shaped mask $RM_4$ is overlapped on a pattern image PI which is deviated from the center CP by +1 pixel in the direction X and +1 pixel in the direction Y (there is a line image LI in the direction +Y). The portion double-hatched represents an overlapped region $A_4$. It can be understood that the ring area characteristics $S_4$ in this example is four (pixels).

Figure 13A:
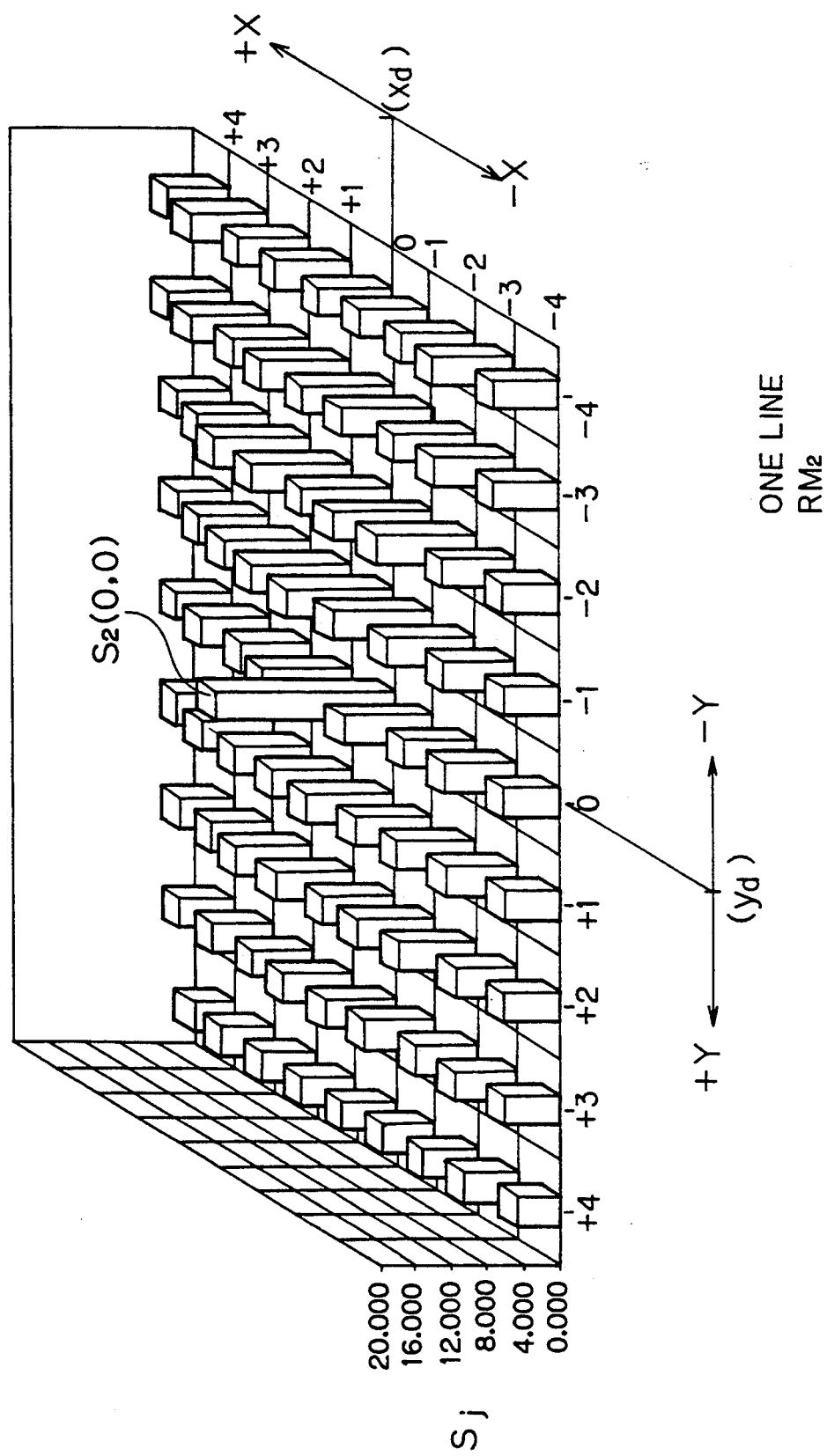
Figure 13B:
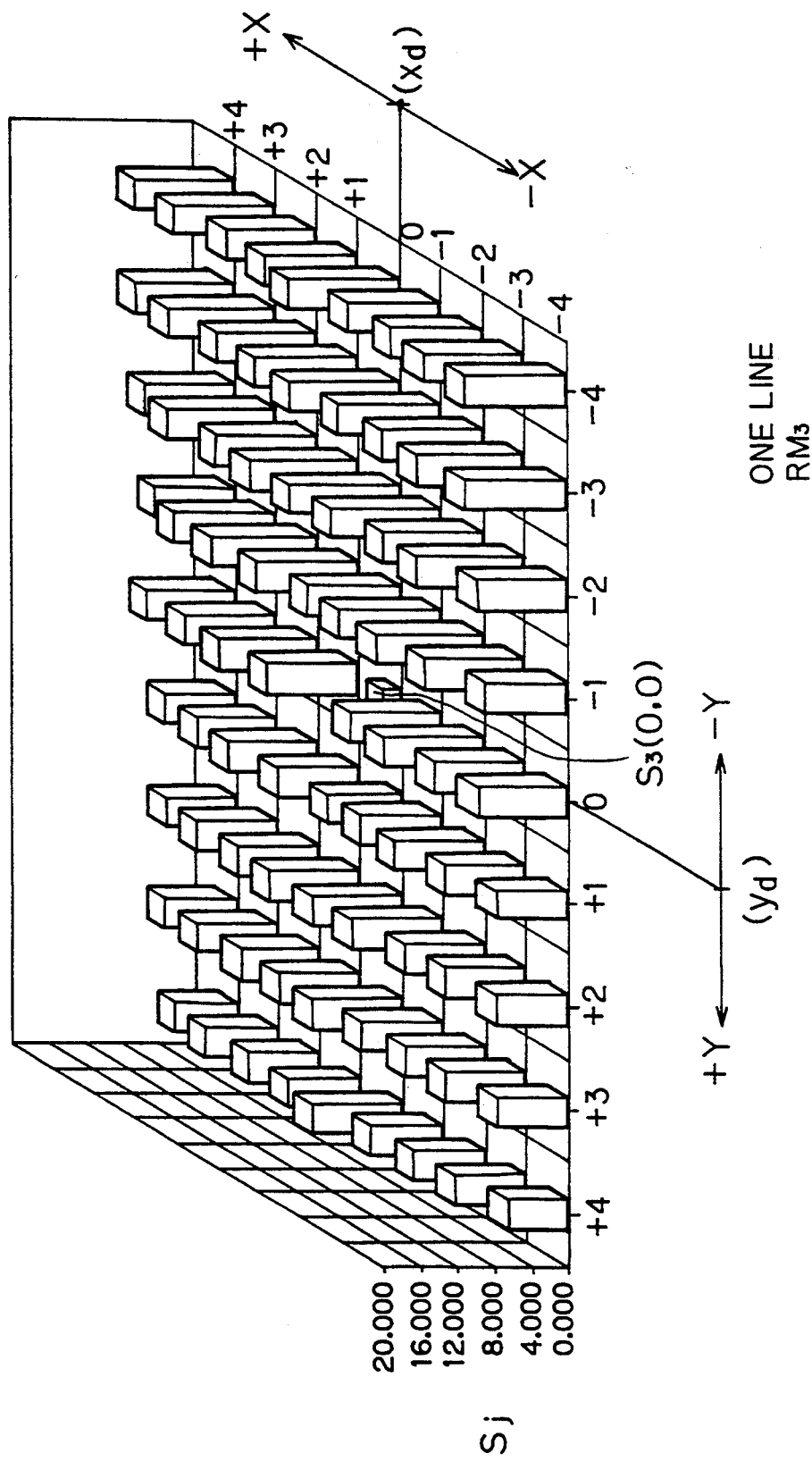
Figure 13C:
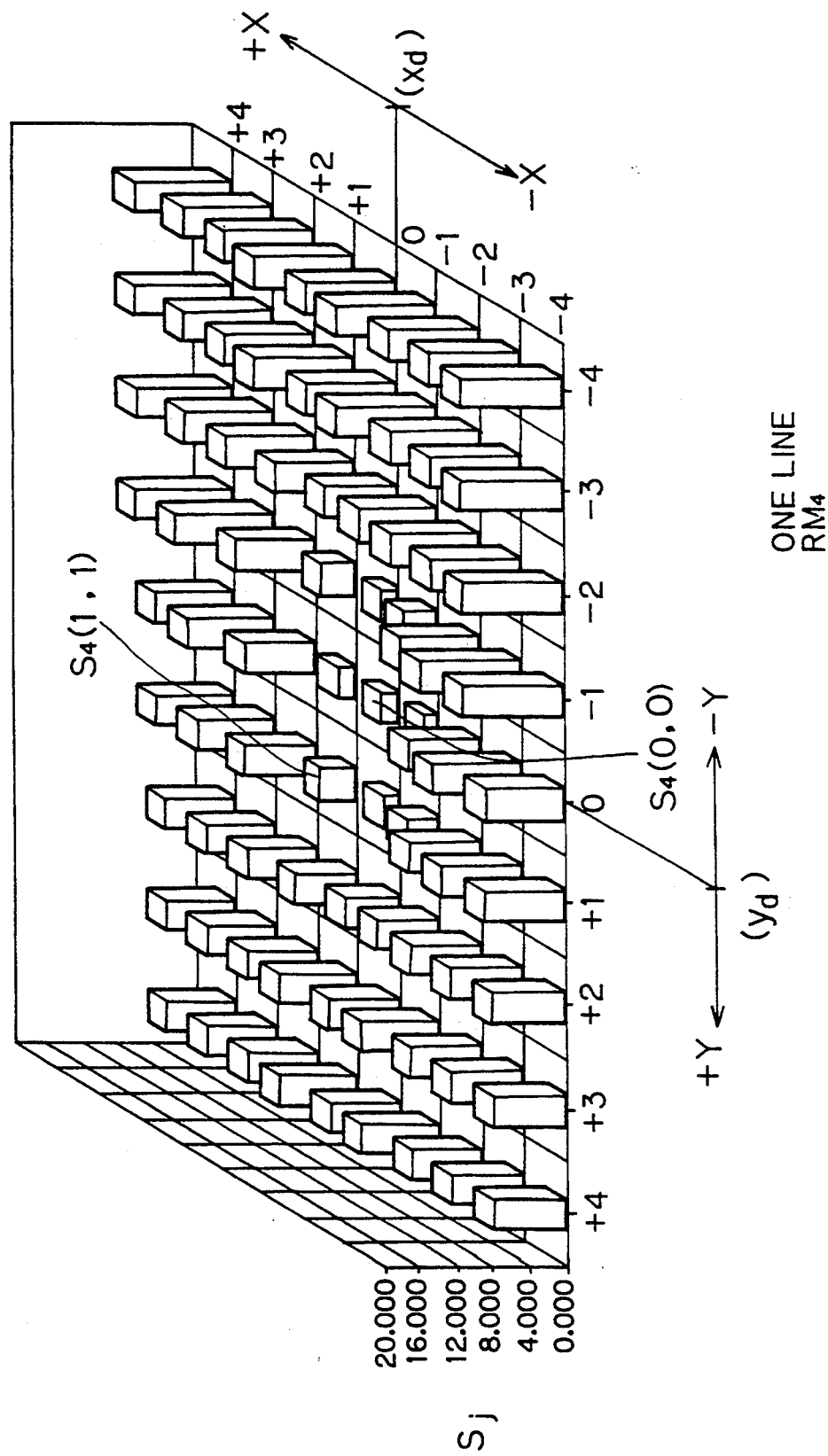
Figure 13D:
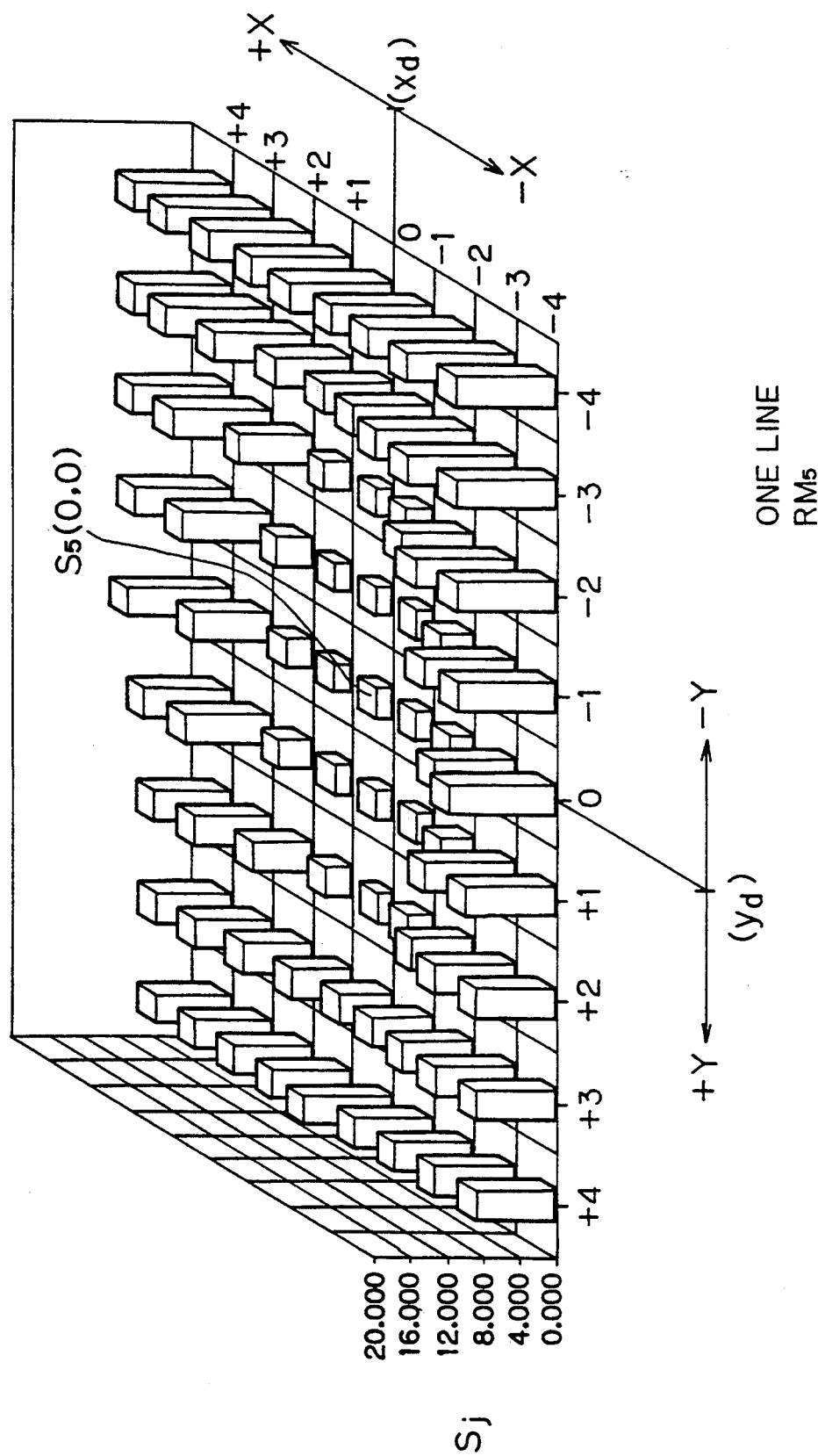
Figure 13E:
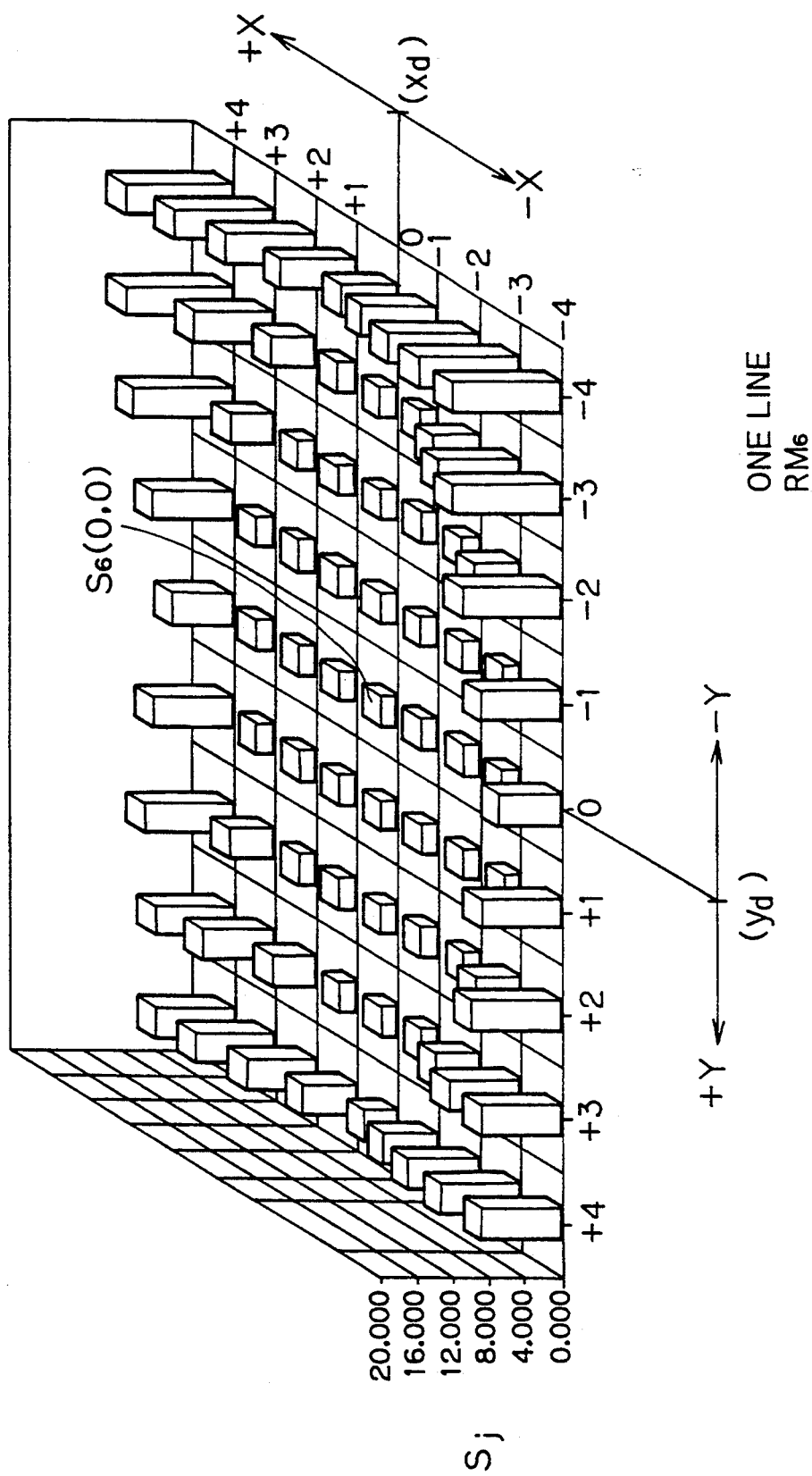
Figure 13F:
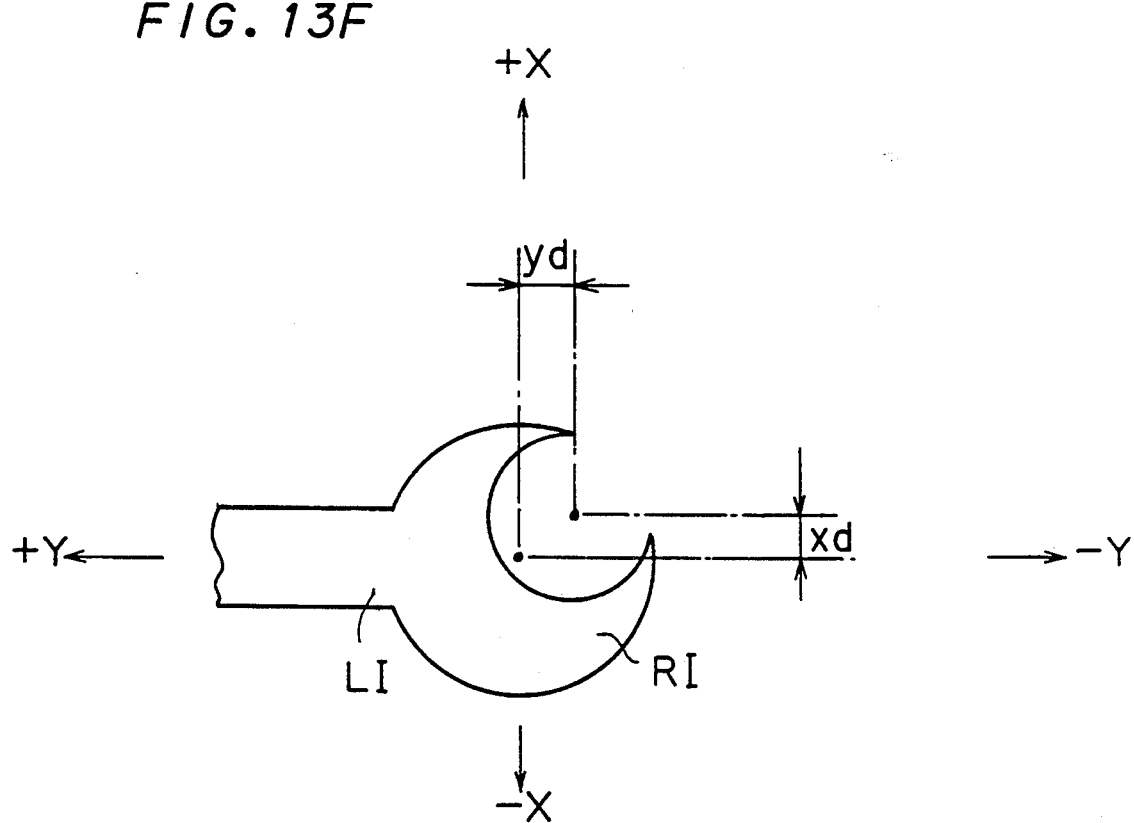
FIGS. 13F and 14F illustrate calculational conditions in the graphs shown in FIGS. 13A to 13E and 14A to 14E, respectively.

FIGS. 13A to 13E and 14A to 14E illustrate the ring area characteristics $S_j$ for various displacement degree of the center of the pattern image PI deviating from the center CP of the hole image HI, wherein the ring-shaped masks $RM_j$ are fixed. In the examples shown in FIGS. 13A to 13E, one line image LI enters a land image RI, while two line images LIs enter a land image RI in the examples shown in FIGS. 14A to 14E. It has been already mentioned in (D-1) with reference to FIG. 6 that the ring area characteristic $\{S_i\}$ does not depend on the direction of the line image LI to enter the land image RI. In the examples shown in FIGS. 13A to 13E, the line image LI enters the land image RI from the direction +Y, as shown in FIG. 13F. In the examples shown in FIGS. 14A to 14E, on the other hand, one line image LI enters the land image RI from the direction +Y and the other line image LI enters from the direction 45° rotated from the direction +Y towards the direction +X. FIGS. 13A to 13E illustrate the examples wherein the ring-shaped masks $RM_2$ to $RM_6$ are overlapped on the pattern image PI. Similarly, FIGS. 14A to 14E illustrate the examples wherein the ring-shaped masks $RM_2$ to $RM_6$ are overlapped on the pattern image PI. (The diameter of the ring-shaped mask $RM_1$ is too small to be overlapped on the pattern image PI and the ring area characteristics $S_1$ thereof takes O, so that it is not illustrated in a figure.) In each of FIGS. 13A to 13E and 14A to 14E, the degree of the displacement is represented by respective values (represented by pixels) along the axes X and Y on the horizontal plane; the value $Y_d$ representing displacement in the directions $\pm Y$ and the value $x_d$ representing displacement in the directions $\pm X$. Respective vertical axes in these figures represent ring area characteristics $s_j(x_d, y_d)$. Use of the letter j means that the ring-shaped mask $RM_j$ is employed. By coordinates $(x_d, y_d)$, it is represented that the pattern PI is displaced by $x_d$ in the direction X and by $Y_d$ in the direction Y. For example, the case shown in FIG. 11 is represented by $S_4(1, 1)$ in FIG. 13C, where the value of the ring area characteristics $S_4$ takes 4.

Described in the first place are the cases wherein only one line image LI enters the land image RI (FIGS. 13A to 13E illustrate these cases). It can be understood that $S_2(0,0)$ is considerably larger than any other ring area characteristics in FIG. 13A. This means that the center of the land image RI coincides with the center CP of the hole image HI, and that the diameter of the ring-shaped mask $RM_2$ is approximate to that of the land image RI. Since the line image LI enters the land image RI from the direction $+Y$, regardless of the size of the ring-shaped masks, the ring area characteristics take values approximately symmetrical with respect to the line of $X=0$.

In the case where the ring-shaped mask $RM_3$ is employed (in the case shown in FIG. 13B), the ring-shaped mask $RM_3$ overlaps with the pattern image PI only by the line image LI when the center of the land image RI coincides with the center CP of the hole image, wherein $S_3(0, 0) = 2$. The same is true to the larger ring-shaped masks, so that the respective ring area characteristics at $(0, 0)$ takes the same value; $S_4(0, 0) = 2$, $S_5(0,0) = 2$, and $S_6(0, 0) = 2$.

As the diameter of the ring-shaped mask $RM_j$ increases the value of $S_j(x_d, y_d)$ gradually decreases from the center towards the periphery (see FIGS. 13B to 13E). This means that when the ring-shaped mask having a large diameter overlaps with the land image RI, the degree of the displacement is relatively high.

In other words, the degree of the land image RI deviating from the center CP of the hole image HI reflected by the ring area characteristics $\{S_i(x_d, yd)\}$.

The same principle is applicable for those cases where two line image LI enter the land image RI (these cases are shown in FIGS. 14A to 14E). Since the overlapped area between the line image LI and the ring-shaped mask $RM_j$ increases, the level of the ring area characteristics as a whole is upward. In these cases, the degree of the land image RI deviating from the center CP of the hole image HI is also reflected by the ring area characteristics. However, the variation of the ring area characteristics in these cases are not symmetrical since one of the line images LI does not enter the land image RI symmetrically.

(D-4) Positional Discrepancy Detecting Neural Network Circuit

Figure 15:
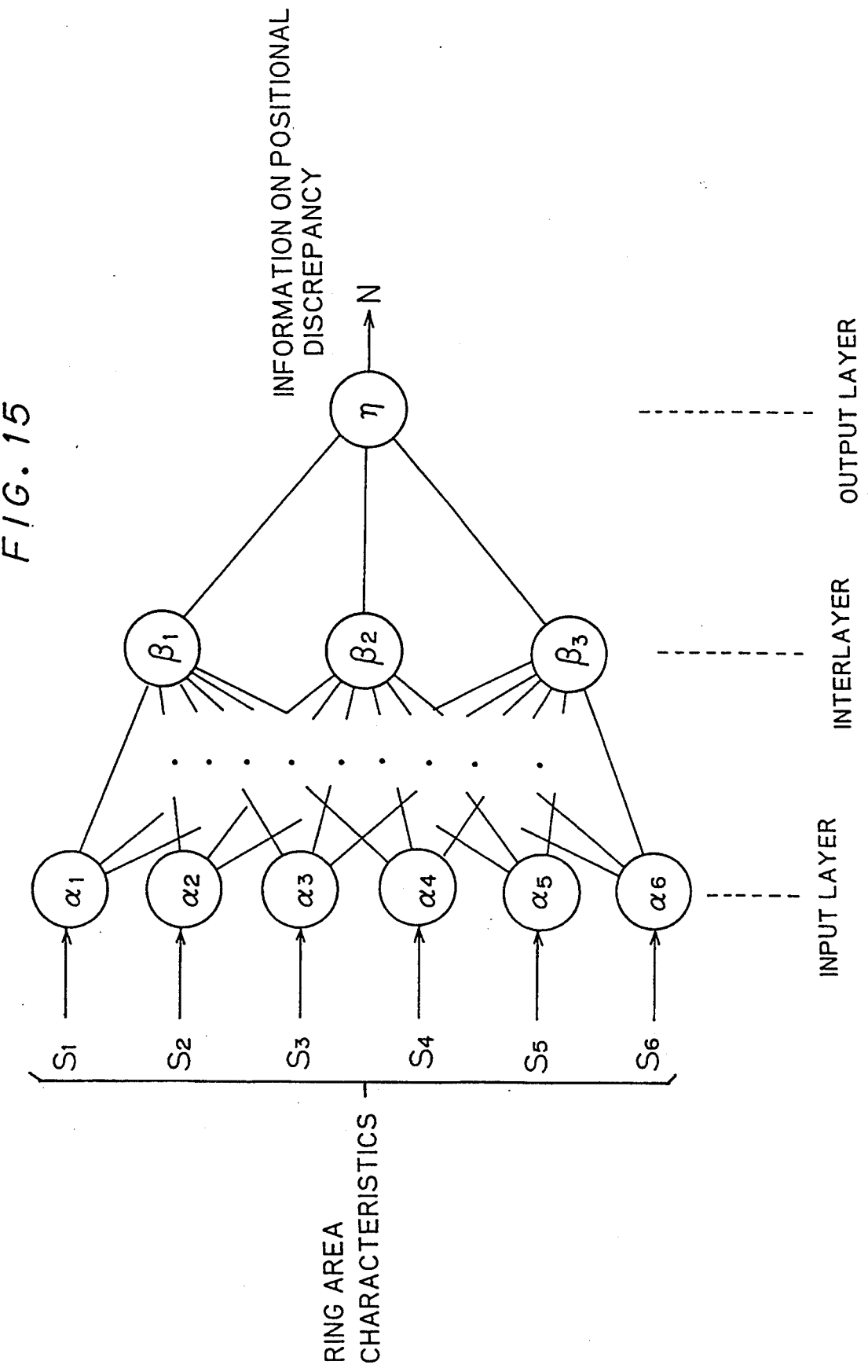
FIG. 15 illustrates a structure for the neural network circuit.

As described above, the value of the ring area characteristics $\{S_i\}$ corresponds to the degree of the positional discrepancy. Consequently, the information N on positional discrepancy can be obtained by finding this correspondence in advance, and inputting the value of the ring area characteristics $\{S_i\}$. The neural network circuit 40 is provided for this purpose. As described in section D-1 above the neural network circuit 40 performs the function of learning. According to the present invention, the neural network circuit 40 comprises an input layer consisting of six units $\alpha_1$ to $\alpha_6$ to which the ring area characteristics $S_1$ to $S_6$ are inputted, respectively, a one-layer interlayer consisting of three units $\beta_1$ to $\beta_3$, and an output layer consisting of one unit $\eta$ (see FIG. 15). Such a neural network circuit may be formed by employing an analogue circuit such as an operational amplifier, a resistor or the like, as well as by using a CPU or a DSP of high speed so that in practice it is employable as a hardware.

Learning by the neural network circuit 40 will be now described. In the first place, a correspondence between various displacement values $(x_d, y_d)$ and the ring area characteristics $\{S_i(x_d, y_d)\}$ is found in the form of data by simulation or measurement. Then, the neural network circuit 40 is taught to output information N specifying a certain displacement value $(x_d, y_d)$ when a ring area characteristics $\{S_i\}$ corresponding to said certain displacement value is inputted. In this way the information N representing a specific displacement $(x_d, y_d)$ can be outputted from the neural network circuit 40 when ring area characteristics $\{S_i\}$ of a printed board is actually inputted therein.

Figure 16A:
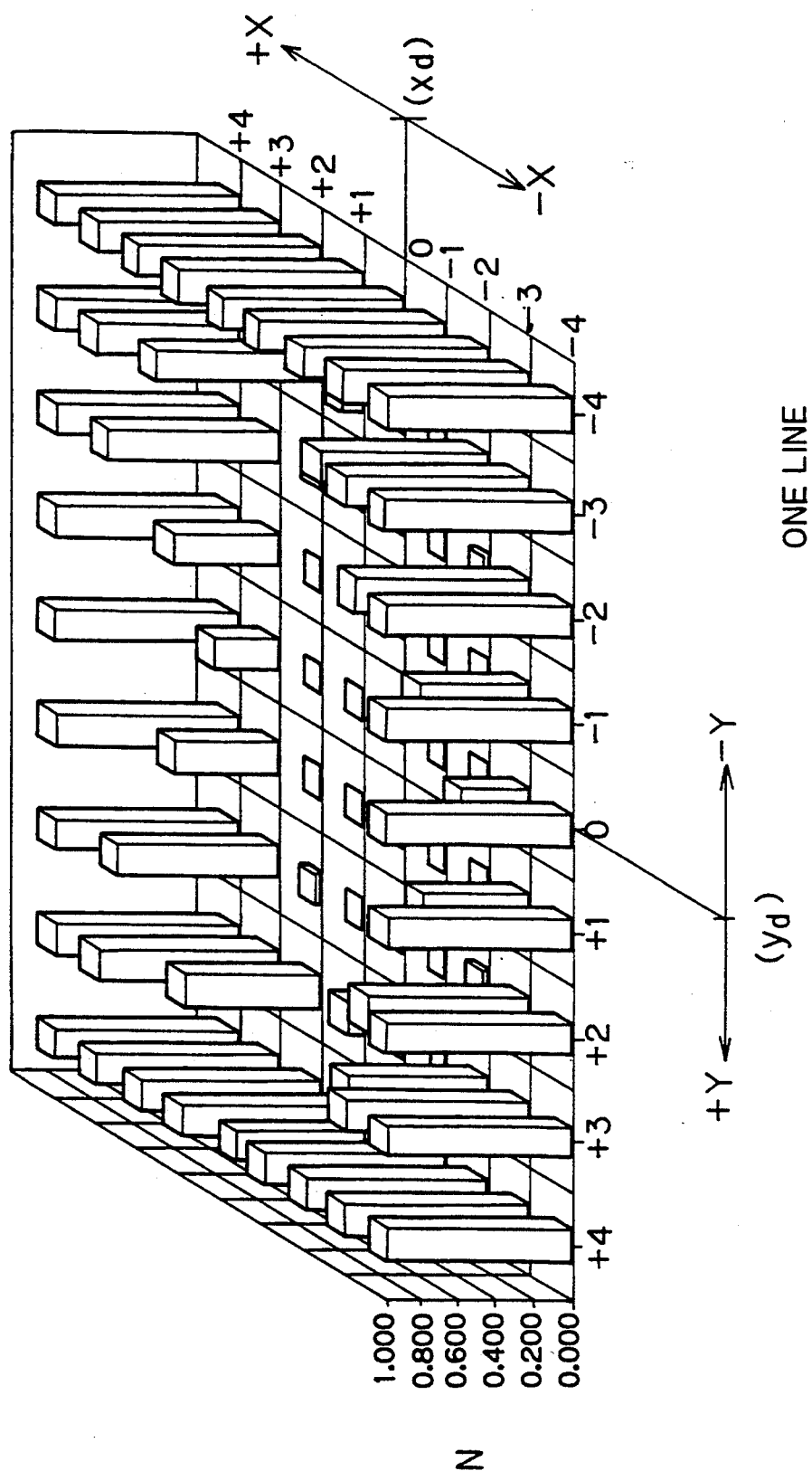

FIG. 16A illustrates a leaning result in the case where one line image LI enters the land image RI from the direction $+Y$. Such a case corresponds to the example shown in FIGS. 13A to 13E. The neural network circuit 40 is taught to output $N=0$ when the center of the land image RI coincides with the center CP of the hole image HI. On the other hand, when the former is displaced from the latter by 4 pixels both in the directions $+X$ and $+Y$, that is, at $(x_d, y_d) = (4,4)$, the circuit 40 outputs $N=1$. The method of learning is concretely described in the above-mentioned book, "Neural Network Information Processing" by Hideki ASO, and will be briefly described here. With $N=1$ (or $N=0$) taken as a correct signal learning is performed by changing a weighting $W_{kj}$ between each two units in compliance with a predetermined rule so as to bring an output N for an input $\{S_i\}$ close to the correct signal.

Similar to the ring area characteristics shown in FIGS. 13A to 13E, the characteristic in FIG. 16A is symmetrical with respect to the directions $+X$ and $-X$. Although two kinds of outputs, i.e., $N=0$ or $N=1$, are employed in the learning, the information N may contain intermediate values between 0 and 1 in correspondence with the positional discrepancy $(x_d, yd)$. As to a certain direction, the higher the degree of the positional discrepancy in that direction is, the larger the value of N is. Consequently, the degree of positional discrepancy can be judged on the basis of the value of N.

Figure 14F:
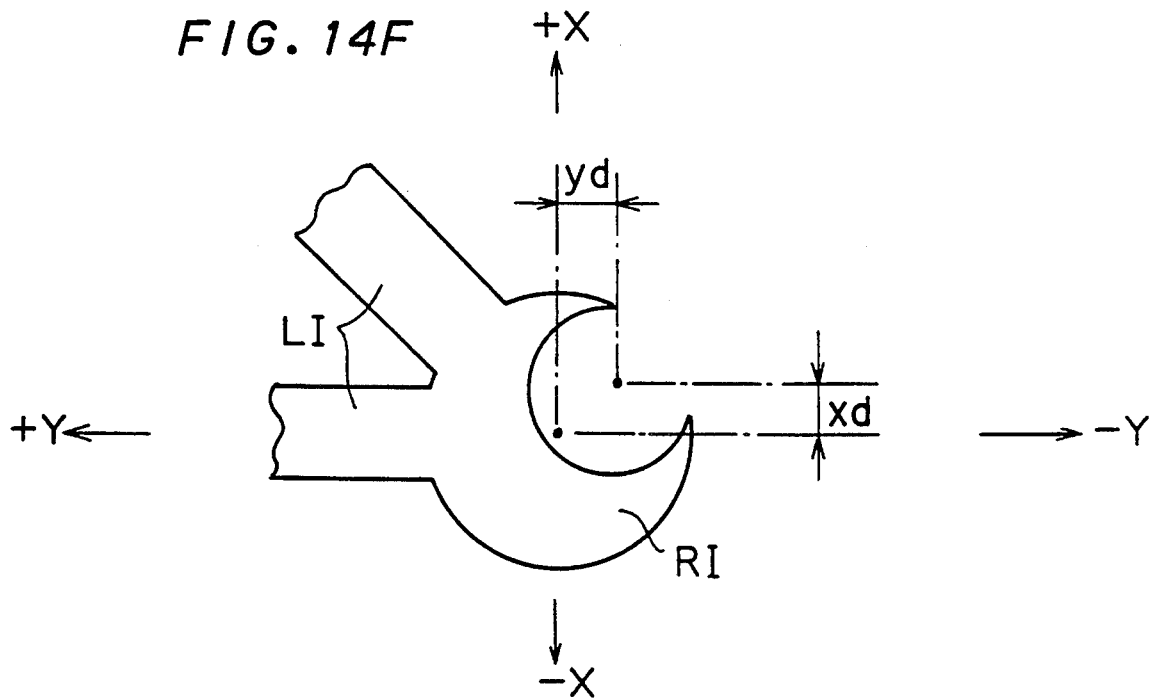
Figure 16B:
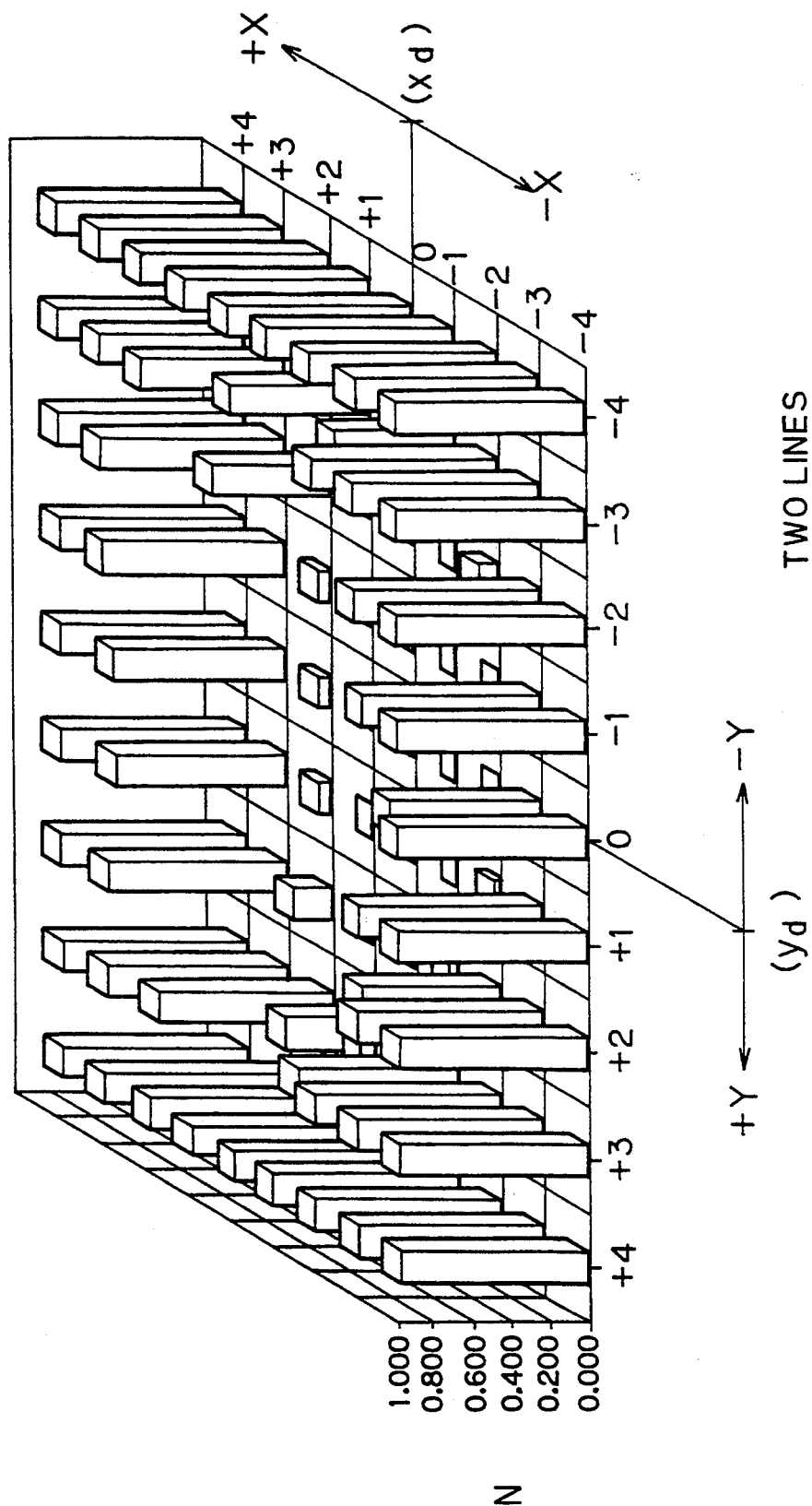

FIG. 16B illustrates an example wherein two line images LIs enter the land image RI. Such a case corresponds to the examples shown in FIGS. 14A to 14E. The directions from which the line images LIs enter the land image RI also corresponds to those shown in FIG. 14F. Here learning is performed for the pattern image corresponding to those in the examples shown in FIGS. 14A to 14E wherein two line images LIs enter the land image RI. It should now be understood that the output N, similar to the example shown in FIG. 16A, contains the information on the positional discrepancy $(x_d, yd_d)$, even when the number of the line image increases. Although the intermediate layer consists of three units according to the above explanation, the number of units in the intermediate layer may be increased or decreased.

(D-5) Defection Judging Circuit

Figure 17A:
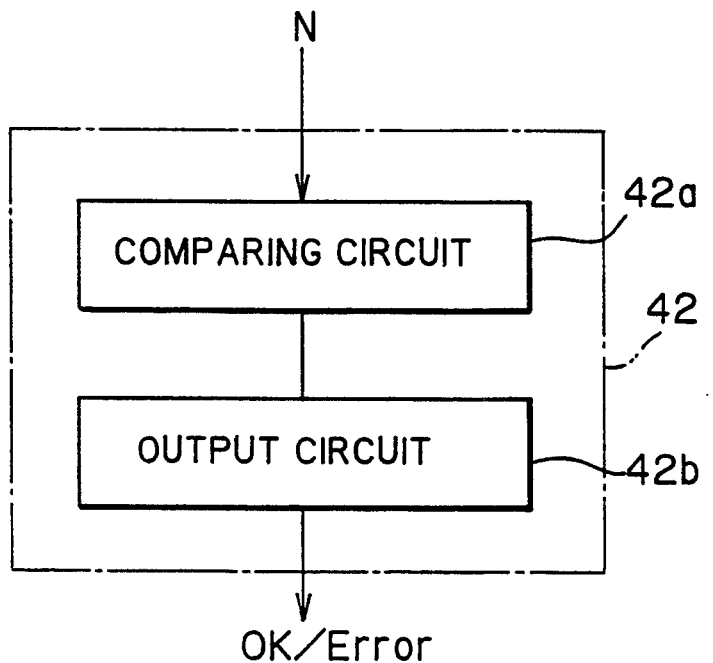
FIG. 17A is a block diagram showing a structure for a defect judging circuit.
Figure 17B:
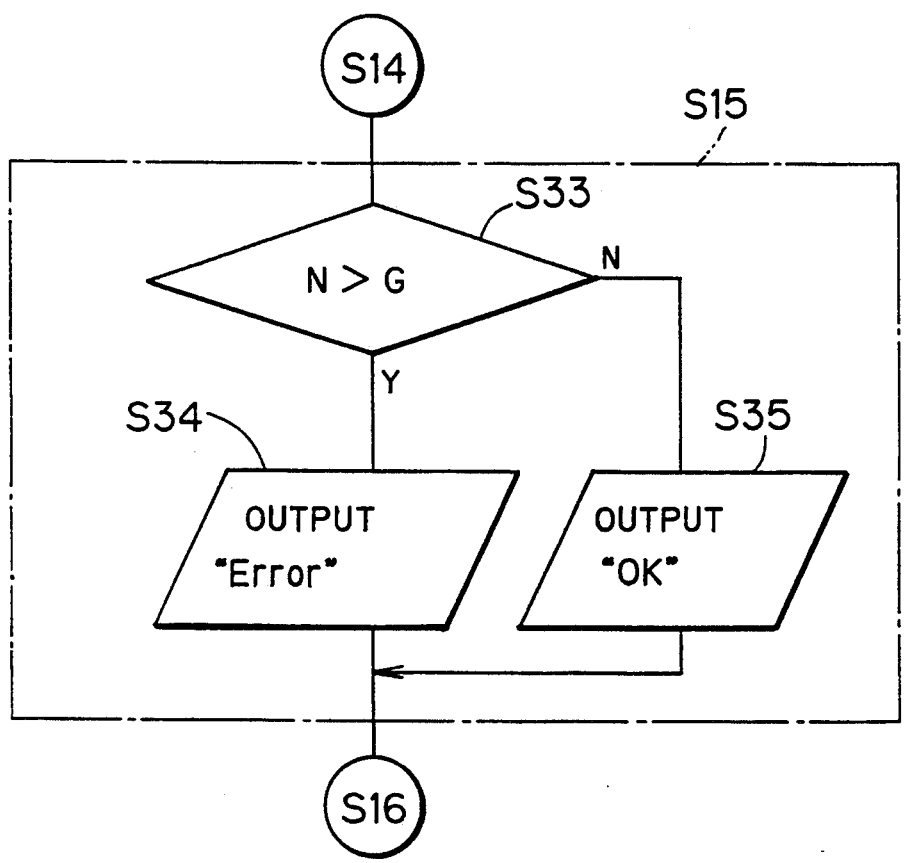
FIG. 17B is a flow chart showing a flow process conducted in the defect judging circuit.
Figure 18A:
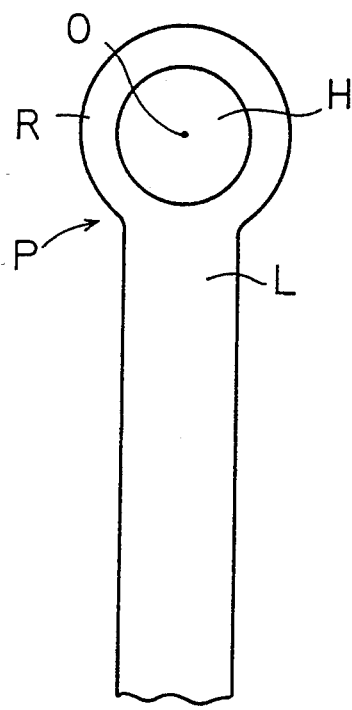
FIGS. 18A, 18B, 19, 20A and 20B illustrate problems of conventional techniques.
Figure 18B:
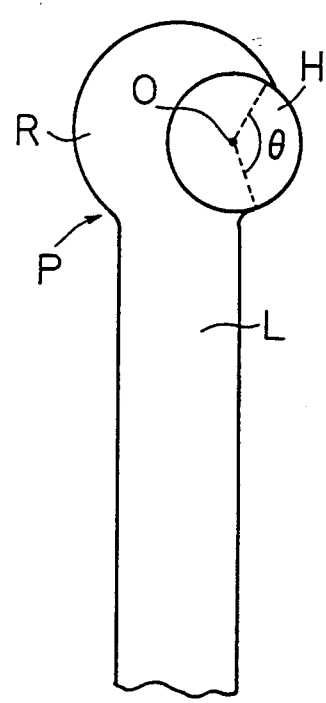
Figure 19:
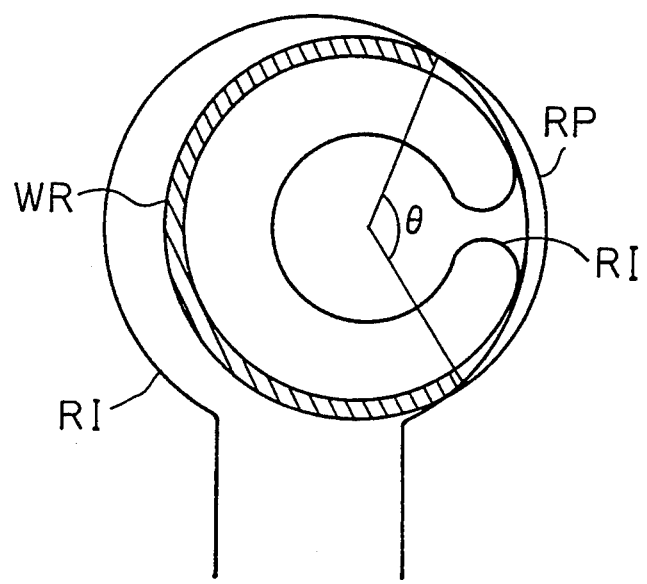
Figure 20A:
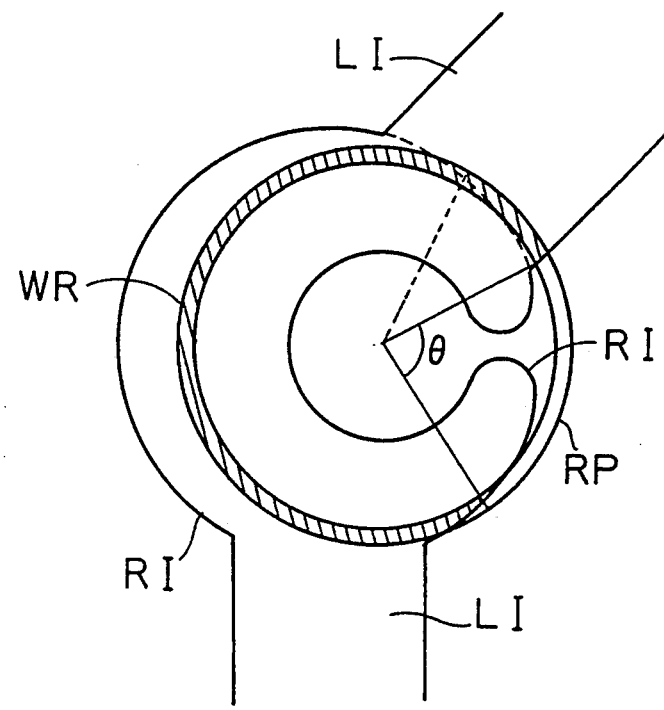
Figure 20B:
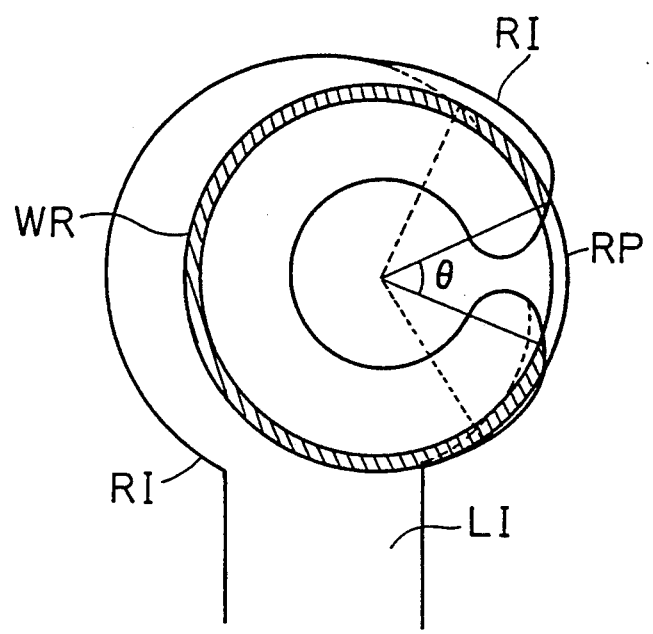

The defection judging circuit judges whether or not the pattern is defective or not on the basis of the information N which is obtained in the manner described above. FIG. 17A is a block diagram showing the defection judging circuit, and FIG. 17B is a flow chart showing a process flow conducted in the circuit shown in FIG. 17A.

The information N is inputted in the comparing circuit 42a, wherein it is compared with a predetermined threshold value G. This comparing processing corresponds to the process step S33 in FIG. 17B. The threshold value G is determined on the basis of a reference value which is previously determined for judging positional discrepancy. FIG. 17C is a graph showing values of the information N corresponding to the degree of positional discrepancy $(0, y_d)$, when one line image enters the land image, and the pattern is displaced only in the direction from which the line image enters the land image. This case corresponds to the case of $x_d=0$ in FIG. 16A. The neural network circuit is taught to output N=1 for positional discrepancy of 4 pixels in both the directions +X and +Y. Even in this case where displacement occurs only in the direction Y but not in the direction X ($x_d=0$), the information N provides means to distinguish, with high sensitivity, between the displacement more than four pixels and that of equal to or less than three pixels. When the displacement of more than four pixels should be judged defective, for example, the threshold value G can be set between 0.2 and 0.8. Thus, it should be understood that the value of the information N itself does not depend on noise. FIG. 17C shows the example wherein the threshold value G is set at 0.5.

After the information N is thus compared with the threshold value G, the result of the judgment, i.e., whether the pattern is defective or not, is outputted. The result is outputted from an output circuit 42b shown in FIG. 17A, and this output processing corresponds to the steps S34 and S35 in FIG. 17B.

It has been already described in section (D-1) that the position which is judged as an error is stored in the defective coordinates memory 43.

The position judged as satisfactory or OK may also be stored in the defective coordinates memory 43. In this case, the output N from the neural network circuit 40 may be preferably stored in the memory 43 at the same time, to be analyzed later.

A plurality of threshold values G may be provided. For example, when two threshold values $G_1$ and $G_2$ are set, the degree of the positional discrepancy can be judged as follows, on the basis of the comparison result between the information N and these threshold values $G_1$ and $G_2$:

when $N > G_1$... Fatal
when $G_1 \geq N > G_2$... Warning
when $G_2 \geq N$ ... Safe What is to be learned by the neural network circuit is not limited to the reference amount of displacement which is determined for judging whether patterns are good or defective. For example, the neural network circuit 40 having an appropriate structure may be chosen so that the degree of displacement may be expressed by a pixel. A pattern image which is displaced by $(x_d, y_d)=(0,2)$ and another pattern image which is in the right position $((x_d, y_d)=(0, 0))$ are employed in the learning of the circuit 40. Then, the circuit 40 may be taught to judge displacements of more than four pixels as defective.

When there are a plurality of criteria provided for judging whether a pattern is good or defective, only one learning may be performed. Otherwise, a plurality of threshold values $G_1, G_2, ...$ may be set in correspondence with a plurality of outputs $N_1, N_2, ...$ from a plurality of neural network circuits each of which has learned. For example, when two threshold values $G_1$ and $G_2$ are set in correspondence with two outputs $N_1$ and $N_2$, patterns may be judged as follows:

when $N_1 > G_1$... Fatal
when $G_2 > N_2$... Safe.

E. Modifications (1) The neural network circuit may learn in advance before inspection on printed boards is started. Learning may be repeated again and again when a need arises. The circuit characteristics of the neural network circuit is improved by repeated learnings.

(2) The number of the ring-shaped masks may be changed according to the accuracy required for inspecting defections. In general, it is preferable to prepare a lot of masks in view of the amount of information to be inputted. However, when too many masks are provided, undesirable conditions arise such that unnecessary information may also be caught, or there is an increase in the number of ring area characteristics to be counted. Therefore, the number of the ring-shaped masks is preferably less than ten. Only a few masks are required when inspection is relatively rough.

(3) According to the present invention, a plurality of similar ring-shaped masks and a plurality of similar pattern images similar to the pattern image PI may be generated. In this case, the area value of each overlapped region between each of the plurality of similar ring-shaped masks and each of the plurality of pattern images is counted to obtain a plurality of ring area characteristics $\{S_i\}$. If the number in the plurality of similar ring-shaped masks is $N_{rm}$ and the number in the plurality of pattern images is $N_{pi}$, the total number of the ring area characteristic is $N_{rm} \times N_{pi}$. The plurality of ring area characteristics are inputted to the neural network to obtain the value N.

Accordingly, the present invention may be conducted by generating the combination of:

one pattern image and a plurality of similar ring-shaped masks;

a plurality of similar pattern images and one ring-shaped mask; or a plurality of similar pattern images and a plurality of similar ring-shaped masks.

While the invention has been shown and described in detail, the foregoing description is in all aspects illustrative and not restrictive. It is therefore understood that numerous modifications and variations can be devised without departing from the scope of the invention.

What is claimed is:

1. A method of inspecting a pattern on a printed board on which a wiring pattern is provided and through which a through hole is formed, said method comprising steps:

(a) of optically reading said printed board to obtain image data comprising a plurality of pixels and representing an image of said printed board;

(b) of obtaining a pattern image representing said wiring pattern and a hole image representing said through hole on the basis of said image data;

(c) of obtaining a plurality of similar ring-shaped masks from said hole image;

(d) of calculating a set of area values each representing an area of an overlapped region of said pattern image and each of said plurality of similar ring-shaped masks;

(e) of obtaining a relative positional relation between said wiring pattern and said through hole as a function of said set of area values;

said relative positional relation being expressed by a characteristic value, and prior to said step (c) said method also comprising steps:

(f) of obtaining a first correlation which shows values of said set of area values in relation to particular states of said relative positional relation, and (g) of utilizing a first neural network to obtain a second correlation which shows values of said characteristic value in relation to particular values of said set of area values;

said step (e) comprising step (e-1) of using said second correlation for converting said set of said area values which are yielded at said step (d) to said characteristic value;

said step (e-1) comprising steps of:

(e-1-1) preparing a second neural network, (e-1-2) teaching said second correlation to said second neural network, and (e-1-3) as said characteristic value, determining an output of said second neural network by inputting said step of said area values to said second neural network;

said step (g) comprising step (g-1) of utilizing a first neural network to obtain said second correlation.

2. A method of inspecting pattern on a printed board in accordance with claim 1, wherein said step (c) further comprises step (c-2) of comparing said characteristic values with a predetermined reference value to thereby judge whether said relative positional relation is appropriate for said printed board.

3. A method of inspecting a pattern on a printed board in accordance with claim 2, wherein:

said step (b) comprises step (b-1) of binarizing said image data to obtain said pattern image and said hole image.

4. A method of inspecting a pattern on a printed board in accordance with claim 3, wherein:

said step (c) comprises steps:

(c-1) of obtaining a center and a radius of said hole image;

(c-2) of obtaining a plurality of circles which are concentric with said hole image as a function of said center and radius of said hole image; and (c-3) of obtaining said plurality of ring-shaped masks from said plurality of circles.

5. A method of inspecting a pattern on a printed board in accordance with claim 4, wherein:

said printed board has first and second major surfaces opposite to each other;

said wiring pattern is provided on said first major surface;

said through hole is formed so as to pierce said printed board between said first and second major surfaces;

said step (a) comprises steps:

(a-1) of applying a light to said first major surface of said printed board;

(a-2) of receiving a reflected light from said first major surface of said printed board; and (a-3) of converting intensity of said reflecting light into an electric signal to obtain said image data.

6. A method of inspecting a pattern on a printed board in accordance with claim 4 wherein:

said printed board has first and second major surfaces opposite to each other;

said wiring pattern is provided on said first major surface;

said through hole is formed so as to pierce said printed board between said first and second major surfaces; and said step (a) comprises steps:

(a-4) of applying a first light to said first major surface of said printed board;

(a-5) of applying a second light to said second major surface;

(a-6) of receiving a reflected light which is obtained by reflection of said first light on said first major surface of said printed board;

(a-7) of receiving a transmitted light which is obtained by transmittance of said second light through said through hole; and (a-8) of converting respective intensities of said reflected light and said transmitted light into said image data.

7. A device for inspecting a pattern on a printed board on which a wiring pattern is provided and through which a through hole is formed, said device comprising:

(a) means for optically reading said printed board to obtain image data comprising a plurality of pixels and representing an image of said printed board;

(b) means for obtaining a pattern image representing said wiring pattern and a hole image representing said through hole on the basis of said image data;

(c) means for obtaining a plurality of similar ring-shaped masks from said hole image;

(d) means for calculating a set of area values each representing an area of an overlapped region of said pattern image and each of said plurality of similar ring-shaped masks; and (e) means for obtaining a relative positional relation between said wiring pattern and said through hole as a function of said set of area values;

said relative positional relationship being expressed by a characteristic value, and said (e) means comprising:

(e-1) means for holding data representing a first correlation which shows values of said set of area values in relation to particular states of said characteristic values, (e-2) means for obtaining a second correlation which shows values of said characteristic value in relation to particular values of said set of area vales, and (e-3) means for using said second correlation for converting said set of area values calculated by said (a) means to said characteristic value; and said (e-2) means comprising (e-2-1) neural network means to which said second correlation is taught and is operable to convert said set of area values into said characteristic value through said second correlation.

8. A device for inspecting a pattern on a printed board in accordance with claim 7, wherein:

said (e-2) means further comprises:

(e-2-2) means for comparing said output value with a predetermined reference value to determine said relative positional relation.

9. A device for inspecting a pattern on a printed board in accordance with claim 8, wherein:

said (b) means comprises:

(b-1) means for binarizing said image data to obtain said pattern image and said hole image.

10. A device for inspecting a pattern on a printed board in accordance with claim 9, wherein:

said (c) means comprises:

(c-1) means for obtaining a center and a radius of said hole image;

(c-2) means for obtaining a plurality of circles which are concentric with said hole image as a function of said center and radius of said hole image; and (c-3) means for obtaining said plurality of ring-shaped masks from said plurality of circles.

11. A device for inspecting a pattern on a printed board in accordance with claim 10, wherein:

said printed board has first and second major surfaces opposite to each other;

said wiring pattern is provided on said first major surface;

said through hole is formed so as to pierce said printed board between said first and second major surfaces; and said (a) means comprises:

(a-1) means for applying a light to said first major surface of said printed board;

(a-2) means for receiving a reflected light from said first major surface of said printed board; and (a-3) means for converting intensity of said reflecting light into an electric signal to obtain said image data.

12. A device for inspecting a pattern on a printed board in accordance with claim 10, wherein:

said printed board has first and second major surfaces opposite to each other;

said wiring pattern is provided on said first major surface;

said through hole is formed so as to pierce said printed board between said first and second major surfaces; and said (a) means comprises:

(a-4) means for applying a first light to said first major surface of said printed board;

(a-5) means for applying a second light to said second major surface;

(a-6) means for receiving a reflected light which is obtained by reflection of said first light on said first major surface of said printed board;

(a-7) means for receiving a transmitted light which is obtained by transmittance of said second light through said through hole; and (a-8) means for converting respective intensities of said reflected light and said transmitted light into said image data.

* * * * *